US011776024B2

(12) United States Patent
Toren

(10) Patent No.: US 11,776,024 B2
(45) Date of Patent: Oct. 3, 2023

(54) SYSTEMS AND METHODS FOR RECOMMENDING RETAILER-SUPPLIER ASSOCIATIONS TO SUPPORT VOLUME STABILITY

(71) Applicant: Shopify Inc., Ottawa (CA)

(72) Inventor: Yizhar Toren, Berlin (DE)

(73) Assignee: Shopify Inc., Ottawa (CA)

( * ) Notice: Subject to any disclaimer, the term of this patent is extended or adjusted under 35 U.S.C. 154(b) by 419 days.

(21) Appl. No.: 17/014,907

(22) Filed: Sep. 8, 2020

(65) Prior Publication Data

US 2022/0076306 A1    Mar. 10, 2022

(51) Int. Cl.
| | | |
|---|---|---|
| *G06Q 30/00* | (2023.01) | |
| *G06Q 30/0601* | (2023.01) | |
| *G06Q 30/0283* | (2023.01) | |
| *G06Q 10/087* | (2023.01) | |
| *G06Q 30/0204* | (2023.01) | |

(52) U.S. Cl.
CPC ....... *G06Q 30/0605* (2013.01); *G06Q 10/087* (2013.01); *G06Q 30/0283* (2013.01); *G06Q 30/0603* (2013.01); *G06Q 30/0204* (2013.01)

(58) Field of Classification Search
CPC ............ G06Q 30/0605; G06Q 10/087; G06Q 30/0283; G06Q 30/0603; G06Q 30/0204
USPC .................................................... 705/26, 27
See application file for complete search history.

(56) References Cited

U.S. PATENT DOCUMENTS

| | | | | |
|---|---|---|---|---|
| 8,666,791 | B1* | 3/2014 | Fedele | G06Q 10/06 705/7.42 |
| 2002/0035537 | A1* | 3/2002 | Waller | G06Q 10/087 705/37 |
| 2002/0128946 | A1* | 9/2002 | Chehade | G06Q 30/0613 705/28 |
| 2008/0162297 | A1* | 7/2008 | Hershkovitz | G06Q 30/06 705/26.81 |
| 2011/0087531 | A1* | 4/2011 | Winters | G06Q 20/40 705/14.1 |
| 2013/0144745 | A1* | 6/2013 | Henderson | G06Q 10/06 705/26.2 |
| 2016/0086118 | A1* | 3/2016 | Reed | G06Q 10/06315 705/7.25 |
| 2016/0337332 | A1* | 11/2016 | Ghosh | G06Q 10/06393 |
| 2021/0312531 | A1 | 10/2021 | McGinnis et al. | |

OTHER PUBLICATIONS

"E-Business models," Cowsey, Alison; Dewar, Rich. Database and Network Journal34.2: 16(4). A.P. Publications Ltd. (Apr. 2004); Dialgo #116489531 5pgs. (Year: 2004).*

* cited by examiner

*Primary Examiner* — Robert M Pond
(74) *Attorney, Agent, or Firm* — Moffat & Co

(57) ABSTRACT

An example procedure includes an operation to obtain a product record for a first product associated with a supplier account of a supplier of the first product, an operation to select, based on the product record a group from amongst a number of online stores, online stores selling products matching the first products and having a stable demand for those matching products, and an operation to associate the supplier account with merchant accounts corresponding to the selected group of online stores to allow the supplier to supply the selected online stores with the first product.

25 Claims, 24 Drawing Sheets

| Merchant ID | ID/SKU | Attributes ||||| Sales data |
|---|---|---|---|---|---|---|
| | | Title | Color | Price | Description | |
| Alpha | 0001 | Light Yoga Mat | Yellow | $15.99 | ~~~~ | ~~~~ |
| Alpha | 0002 | Summer Mat | Yellow | $12.99 | ~~~~ | ~~~~ |
| Alpha | 0003 | Mat Carrier | Black | $8.99 | ~~~~ | ~~~~ |
| Alpha | 0004 | Winter Mat | Green | $13.49 | ~~~~ | ~~~~ |
| Alpha | 0005 | Mat Cleaner | Clear | $4.95 | | |
| Beta | 0001 | Yoga Mat | Yellow | €13.99 | ~~~~ | ~~~~ |
| Zed | 0001 | Thin Yoga Mat | Yellow | £11.99 | ~~~~ | ~~~~ |

Fig. 9

SYSTEMS AND METHODS FOR RECOMMENDING RETAILER-SUPPLIER ASSOCIATIONS TO SUPPORT VOLUME STABILITY

FIELD

The present disclosure relates generally to electronic commerce and, more particularly, to associating merchant and supplier accounts for an e-commerce platform to support ordering volume stability.

BACKGROUND

A merchant may use an e-commerce platform to sell products to customers. A merchant may obtain some or all of the products they sell to customers from one or more suppliers.

SUMMARY

Suppliers lacking a large, stable demand for a product have increased costs of production, costs associated with re-tooling production capacity, costs associated with maintaining excess production capacity to manage fluctuations, and/or inability to meet product requests, resulting in lost sales and/or reduced client satisfaction. Accordingly, suppliers interfacing with e-commerce platforms experience increased capital costs, fluctuating inventory, increased production costs, and/or increased structural risk. Some e-commerce platforms interact with a large number of distributed merchants, where a given merchant may lack the procurement infrastructure, volume, and/or financial capacity to negotiate favorable terms with suppliers. Additionally, a given merchant may not have sufficient volume to warrant a full procurement process, including negotiating with specific suppliers and/or arranging other aspects of the supply relationship.

The described challenges experienced by suppliers and merchants are especially acute with an e-commerce platform. Merchants for an e-commerce platform may be widely distributed, numerous, with variations in geography, product volume, and the like. Additionally, merchants for an e-commerce platform may be organizationally lean, lacking inventory space, and/or lacking an extensive purchasing or supply chain function.

Embodiments of the present disclosure facilitate developing a stable volume demand for a supplier interacting with an e-commerce platform, support monitoring and updating the volume demand, and support providing merchants associated with online stores with convenient and favorable supply terms for relevant products, leveraged with the volume of other merchants.

An example procedure includes an operation to obtain a product record for a first product associated with a supplier account of a supplier of the first product, an operation to select, based on the product record and from amongst a number of online stores, online stores selling products matching the first products and with stable demand, at least in the aggregate, for those matching products, and an operation to associate the supplier account with merchant accounts corresponding to the selected online stores to allow the supplier to supply the selected online stores with the first product. An example procedure includes an operation to detect that the aggregated group of online stores no longer has stable demand for those matching products, and an operation, responsive to the detecting, to determine one or more online stores that, when added to the aggregated group of online stores, provides a stable demand for those matching products.

Certain further aspects of an example procedure are described following, any one or more of which may be present in certain embodiments. An example procedure includes, where each of the online stores of the number of online stores has a respective set of products for sale, and where information describing the attributes of products of the respective sets of products is stored in product records, where each record is stored in association with a product identifier, and where the operation to determine that a given one of the products of the respective sets of products matches the first product by performing operations including: determining that a given one of the products of the respective sets of products matches the first product by comparing information in the product record describing an attribute of the first product to information in product records of the number of online stores describing a corresponding attribute of the given one of the products, and based on the comparing, determining that the first product and the given one of the products are related products.

An example procedure includes the product record for the first product including information describing one or more attributes of the first product. An example procedure includes where the online stores selling products matching the first product and with stable demand, at least in the aggregate, for those matching products are selected based on historical sales data for those matching products. An example procedure further includes selecting, from amongst the number of online stores, online stores selling products matching the first products and with stable demand, at least in the aggregate, for those matching products by performing operations including: identifying product records of the number of online stores with information describing an attribute matching a corresponding attribute of the first product to determine online stores selling products matching the first product, and selecting, based on historical sales data, a set of online stores from the number of online stores that sell products matching the first product and have, based on the historical sales data, stable sales of those matching products over a defined period. An example procedure further includes determining stable sales by determining sales corresponding to a sales volume over a threshold within the defined period, and/or determining stable sales by determining that a sales volume varies by less than a defined amount within the defined period.

An example procedure includes determining respective price recommendations for merchants associated with the selected online stores for purchase of the first product. An example procedure further includes obtaining a pricing structure for supply of the first product by the supplier, where the respective prices (such as price recommendations) are determined based on the pricing structure.

An example procedure includes associating the supplier account with the merchant accounts corresponding to the online stores to allow the supplier to supply the selected online stores with the first products by performing an operation including sending at least one of a picture of the first product and/or a description of the first product to merchant device(s) associated with the merchant accounts. An example procedure includes associating the supplier account with the merchant accounts corresponding to the online stores to allow the supplier to supply the selected online stores with the first products by performing an operation including storing at least one of a picture of the first product and/or a description of the first product in association with one or more of the merchant accounts.

An example procedure includes an operation to send, to a merchant device associated with the merchant account associated with a given one of the selected online stores, a request to associate the supplier account with the given one of the merchant accounts, and an operation to receive, from the merchant device associated with the merchant account associated with the given one of the online stores, an indication confirming that the supplier account should be associated with the given one of the merchant accounts, and where the supplier account is associated with the merchant account associated with the given one of the selected online stores responsive to receiving the indication confirming that the supplier account should be associated with the given one of the merchant accounts.

An example procedure includes an operation to send, to a supplier device associated with the supplier account, a request to associate the supplier account with the given one of the merchant accounts, and an operation to receive, from the supplier device associated with the supplier account, an indication confirming that the supplier account should be associated with the given one of the merchant accounts, and where the supplier account is associated with the merchant account associated with the given one of the selected online stores responsive to receiving the indication confirming that the supplier account should be associated with the given one of the merchant accounts.

An example procedure includes an operation to generate a common purchase order for the first product from the supplier, the common purchase order corresponding to purchases of the first product by the selected online stores. An example procedure includes an operation to detect that one of the selected online stores and/or a sub-group of the online stores, no longer has stable demand for at least one of the matching products and the first product, and an operation, responsive to the detecting, to disassociate the supplier account with the merchant account corresponding to the one of the selected online stores. An example procedure includes an operation to replace one or more of the products matching the first product with the first product in one or more of the selected online stores.

An example system includes a memory storing a supplier account, a product record, and a number of merchant accounts, and a processor configured to obtain the product record for a first product associated with a supplier account, the supplier account corresponding to a supplier of the first product, to select, based on the product record and from amongst a number of online stores, online stores selling products matching the first product with stable demand for those matching products, and to store in the memory an association between the supplier account and merchant account(s) corresponding to the selected online stores to allow the supplier to supply the selected online stores with the first product.

Certain further aspects of an example system are described following, any one or more of which may be present in certain embodiments. An example system includes each of the online stores of the number of online stores having a respective set of products for sale, where information describing attributes of products of the respective sets of products is stored in product records in the memory, each record stored in association with a product identifier, and where the processor is further configured to determine that a given one of the products of the respective sets of products matches the first product by performing the operations of: comparing information in the product record describing an attribute of the first product to information in product records of the number of online stores describing a corresponding attribute of the given one of the products, and, based on the comparing, determining that the first product and the given one of the products are related products.

An example system includes the processor further configured to send, to a merchant device associated with the merchant account associated with a given one of the selected online stores, a request to associate the supplier account with the given one of the merchant accounts, and to receive, from the merchant device associated with the merchant account associated with the given one of the selected online stores, an indication confirming that the supplier account should be associated with the given one of the merchant accounts.

An example system includes the processor further configured to send, to a supplier device associated with the supplier account, a request to associate the supplier account with the given one of the merchant accounts, and to receive, from the supplier device associated with the supplier account, an indication confirming that the supplier account should be associated with the given one of the merchant accounts.

An example system includes, where the product record for the first product includes information describing one or more attributes of the first product, and where the processor is further configured to determine the matching products by comparing a particular attribute of the first product to a corresponding attribute of a candidate product sold by one of the number of online stores, and determining the candidate product is one of the matching products based on the comparing. An example system includes the processor further configured to select the online stores selling products matching the first product and having stable demand for those matching products based on historical sales data for those matching products. An example system further includes the processor further configured to select, from among the number of online stores, online stores selling products matching the first product and having stable demand for those matching products, by performing operations including: identifying product records of the number of online stores with information describing an attribute matching a corresponding attribute of the first product to determine online stores selling products matching the first product, and to select, based on the historical sales data, as set of online stores from the number of online stores that sell products matching the first product and that have, based on the historical sales data, stable sales of those matching products over a defined period. An example system includes the processor further configured to determine stable sales responsive to a sales volume over a threshold within the defined period, and/or to determine stable sales responsive to a sales volume varying by less than a defined amount within the defined period.

An example embodiment of the present disclosure includes a non-transitory computer-readable storage medium storing instructions, that when executed by a processor of a computer system cause the computer system to: obtain a product record for a first product associated with a supplier account of a supplier of the first product; select, based on the product record and from amongst a number of online stores, online stores selling products matching the first product with stable demand for those matching products; and store an association between the supplier account and merchant accounts corresponding to the selected online stores to allow the supplier to supply the selected online stores with the first product.

BRIEF DESCRIPTION OF THE FIGURES

FIG. 9 is a schematic depiction of merchant data according to certain embodiments of the present disclosure.

DETAILED DESCRIPTION

For illustrative purposes, specific example embodiments will now be explained in greater detail below in conjunction with the figures.

Figure 1:
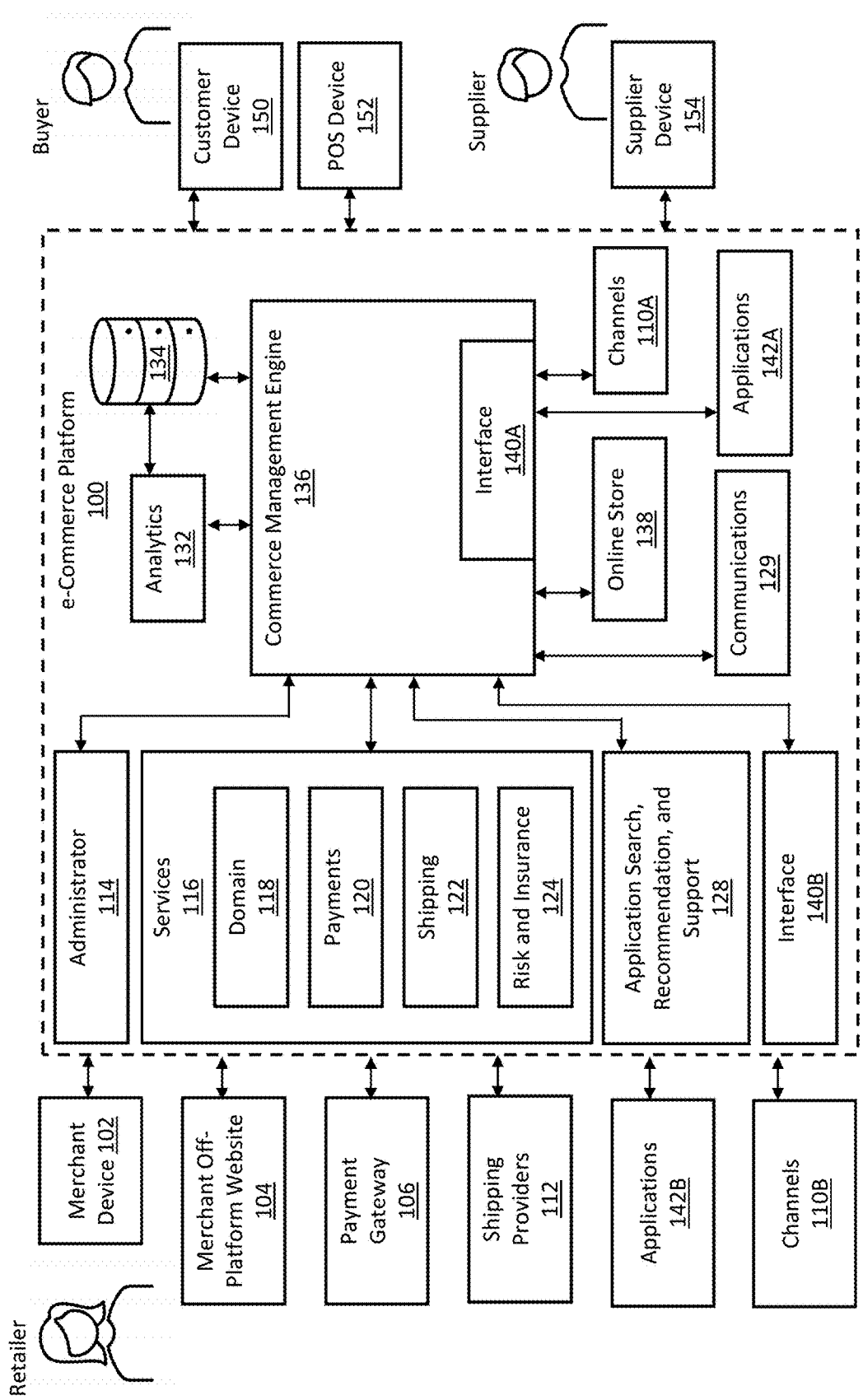
FIG. 1 is a schematic depiction of an embodiment of an e-commerce platform.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'retailer' (or a 'merchant'), a 'buyer' (or a 'customer'), and a 'supplier' may be more than individuals, for simplicity the description herein may generally refer to retailers, merchants, buyers, customers, and suppliers as such. All references to retailers, merchants, buyers, suppliers, and customers throughout this disclosure should also be understood to be references to groups of individuals, companies, corporations, computing entities, and the like, and may represent for-profit or not-for-profit exchange of products. Further, while the disclosure throughout refers to 'retailers', 'buyers', 'merchants', 'customers', and 'suppliers', and describes their roles as such, the e-commerce platform 100 should be understood to more generally support users in an e-commerce environment, and all references to retailers, buyers, merchants, customers, and suppliers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), a supplier user (e.g., providing products to merchants, online stores, and/or shipping products on behalf of merchants and/or online stores), and the like. Note that a user may access the e-commerce platform 100 for different reasons at different times. For example, a user may interact with the e-commerce platform 100 as a merchant at one time, as a supplier at another time, and as a customer at yet another time. Additionally, an interaction may be consistent with aspects of more than one role, for example a given interaction may have features of a merchant interaction and a supplier interaction simultaneously. The utilization of role language, such as retailer, buyer, merchant, customer, user, supplier, or other roles, is made to provide a context for the disclosed aspects, and is not limiting to the roles or interactions for a given user.

The e-commerce platform 100 may provide a centralized system for providing merchants with online resources and facilities for managing their business. The facilities described herein may be deployed in part or in whole through a machine that executes computer software, modules, program codes, and/or instructions on one or more processors and/or engines which may be part of or external to the platform 100. The instructions, when executed, cause the processor and/or engine to perform operations to functionally execute the related operations. Alternatively, some or all of processors and/or engines recited herein may be implemented using dedicated circuitry, such as an application specific integrated circuit (ASIC), a graphics processing unit (GPU), or a programmed field programmable gate array (FPGA). Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, a supplier may interact through a supplier device 154 (e.g., computer, laptop computer, mobile computing device, and the like), a proprietary application, web-based application, dedicated terminal, and/or any other supplier interface device known in the art. The e-commerce platform 100 may enable suppliers to reach merchants through the online store 138, facilities provided by the e-commerce platform 100 such as the communications facility 129, a supply association engine 302, and/or through the operation of merchant device and/or supplier device interfaces (including at least transmitted messages, received responses, and/or access provided to stored data values), provided by the e-commerce platform 100 as described throughout the present disclosure.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
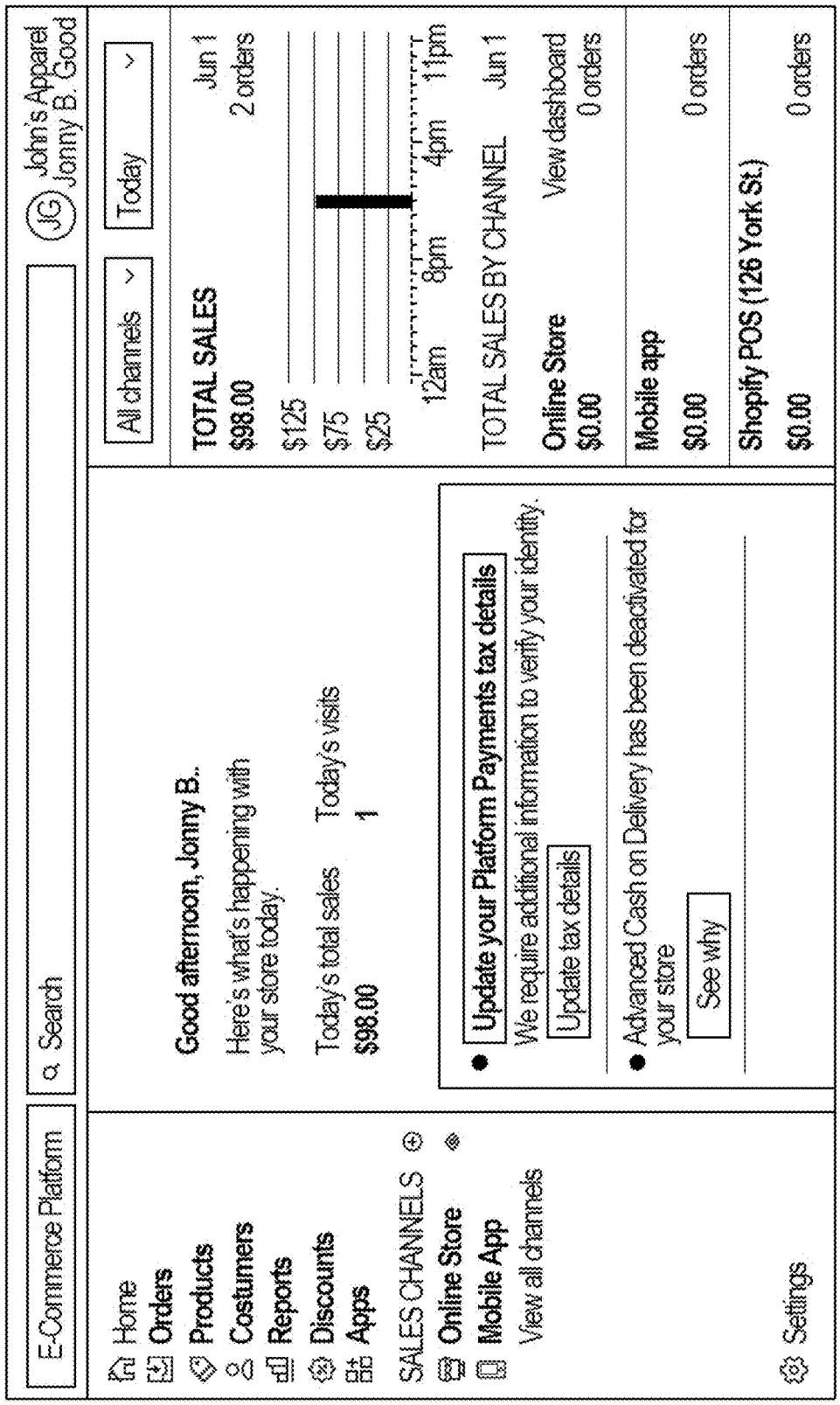
FIG. 2 is a schematic depiction of an embodiment of a home page of an administrator.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports, and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code, and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation, and support 128. Application search, recommendation, and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency, or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

Implementation of Stable Volume Demand Support for Suppliers

Figure 3:
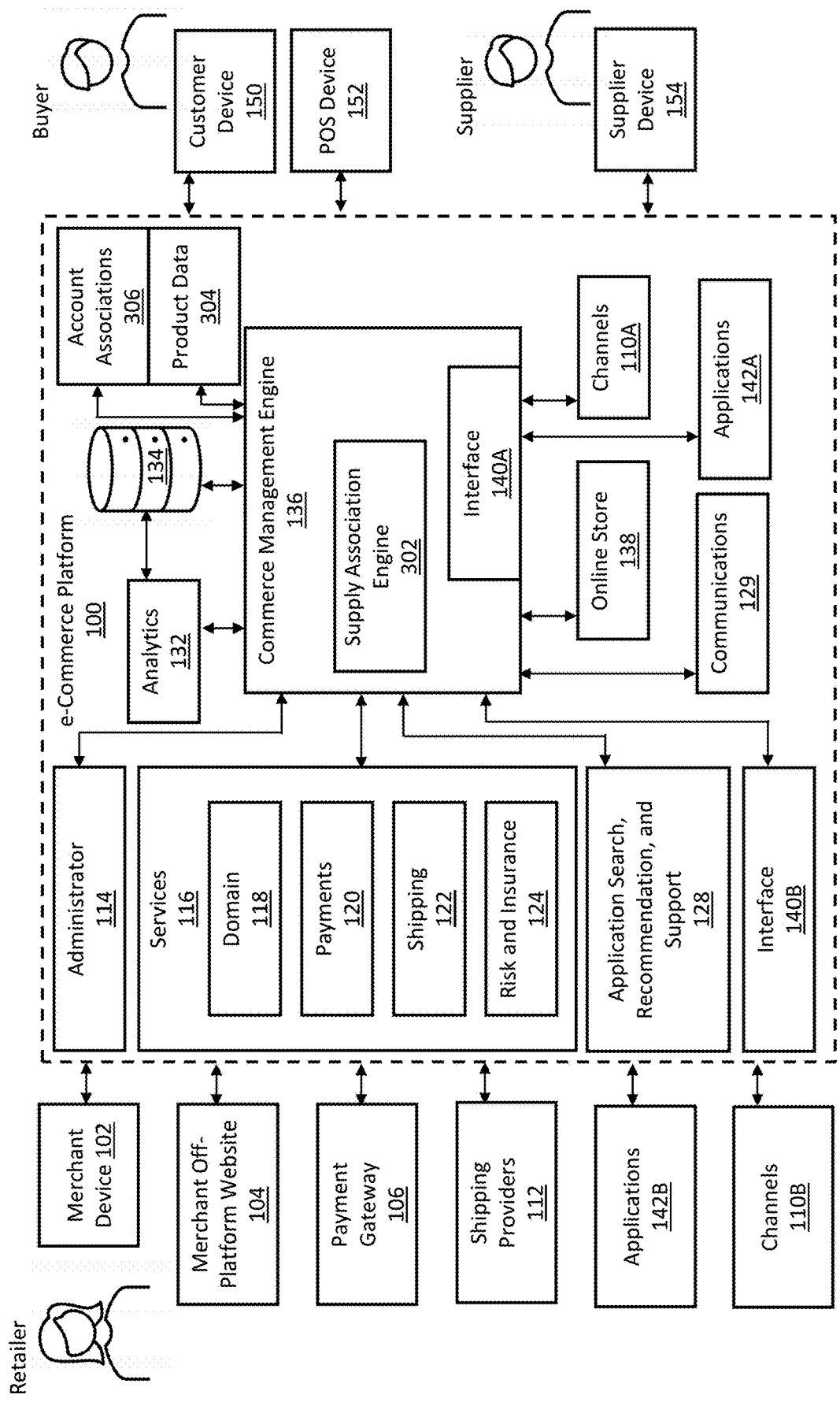
FIG. 3 is a schematic depiction of an embodiment of an e-commerce platform having a supply association engine.

An example e-commerce platform 100 supports providing suppliers with stable volume support (e.g., a stable demand), for example providing suppliers with a group of merchants associated with online stores 138, where the supplied group of merchants together have enough demand for a particular product of the supplier to produce a useful demand base for the particular product. FIG. 3 illustrates an e-commerce platform 100 consistent with the example of FIG. 1, but further including a supply association engine 302, a data store having product data 304, and a data store having account associations 306. As with other examples throughout the present disclosure, the position of implementing components, such as the supply association engine 302 and data stores 304, 306 are a non-limiting example provided for the purpose of illustration. Components of the e-commerce platform 100 may be arranged in any manner, including with components distributed in more than one location, combined in whole or part with other components, and/or provided in alternate arrangements, including communicative coupling as desired to implement operations, functions, and/or to support embodiments as set forth throughout the present disclosure. Additionally or alternatively, processing resources, memory resources, and/or communication resources may be arranged to implement aspects of the present disclosure, which may include storing information (e.g., computer readable instructions, stored data, etc.) in more than one location, generating data during operations, moving information during operations, and/or utilizing alternative during at least some operating conditions. In certain embodiments, aspects of the supply association engine 302 and/or other components of the e-commerce platform 100 may be implemented in a distributed computing device and/or at least partially on a user device (e.g., a merchant device 102, supplier device 154, and/or customer device 150), which may depend upon the specific implementation and/or operating condition. The example supply association engine 302 performs operations to determine a product to be supplied (e.g., a first product to be supplied by supplier), to determine a group of merchants that have a stable volume demand, at least in the aggregate, for the first product, and facilities (e.g., stored account associations 306, and supporting operations of the supply association engine 302) to facilitate ordering of the first product by associated merchants from the supplier. In certain embodiments, the product data 304 includes information about the first product, such as product attributes, production volume descriptions (e.g., current capacity, available capacity, and/or lead times), and/or cost descriptions (e.g., cost of production, sale price available by the supplier, and/or descriptions of a cost or sale price function). In certain embodiments, the product data 304 for the first product may be generated and stored during operations of the supply association engine 302, queried from the supplier device 154, initiated by the supplier, and/or stored for use in monitoring, updating, and/or improving operations of the supply association engine 302 over time. In certain embodiments, the product data 304 includes information about online store 138 products sold by associated merchants, which may be utilized by the supply association engine 302, and/or utilized otherwise in the e-commerce platform 100 to facilitate any operations set forth throughout the present disclosure. In certain embodiments, the product data 304 for online stores 138 and associated merchants may be generated and stored during operations of the supply association engine 302, queried from online stores 138, queried from merchant device(s) 102, queried from merchant off-platform website(s) 104, initiated and/or supplied by any of these, and/or stored for use in monitoring, updating, and/or improving operations of the supply association engine 302 over time.

Figure 4:
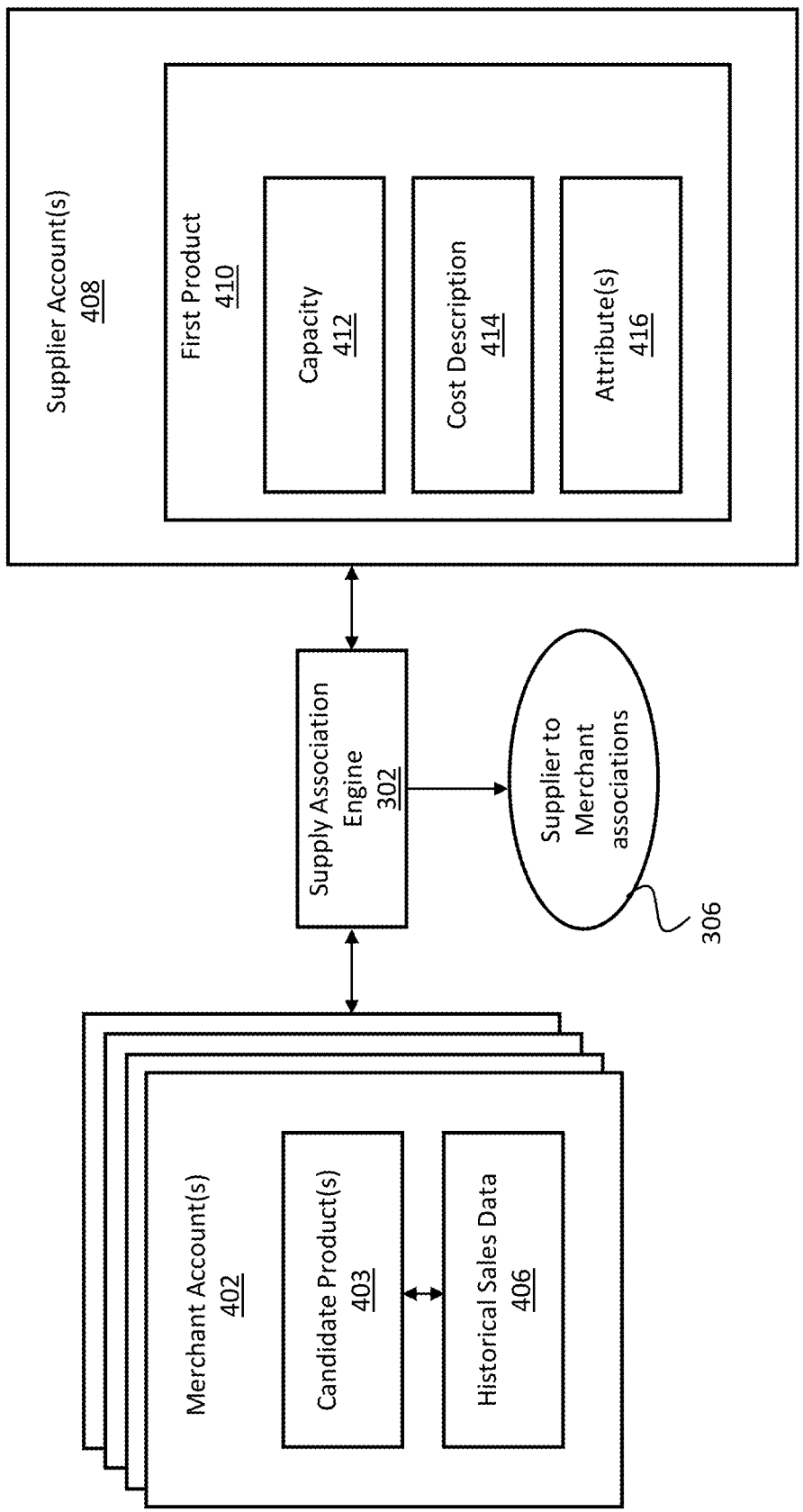
FIG. 4 is a schematic depiction of an embodiment of a supply association engine determining an association between a supplier account and merchant account(s).

Referencing FIG. 4, an example supply association engine 302 is depicted, which is communicatively coupled to a number of merchant accounts 402 and a supplier account 408. The accounts 402, 408 may be stored on the e-commerce platform 100, such as in data store 134, and/or distributed between data stores and/or devices 102, 154. The accounts 402, 408 are at least intermittently accessible by the supply association engine 302, and depicted schematically as coupled to the supply association engine 302 in FIG. 4 for clarity of description. The example merchant accounts 402 include associated data records, which may be stored with the account or as part of the account, and which may include aspects such as the merchant identifier, related online stores 138 and/or off-platform websites 104, metadata, and other aspects utilized to implement the e-commerce platform 100 or otherwise disclosed herein (e.g., reference FIG. 8 and the related disclosure). The example merchant accounts 402 are also associated with product data, which includes products (depicted as candidate products 403 relative to the supply association engine 302), and historical sales data 406 associated with the products. The product data may be stored separately from the merchant accounts 402, and/or may be generated from available data accessible to the e-commerce platform 100 during operations of the supply association engine 302. The example supplier accounts 408 are associated with first product 410 data, which includes product data for a product supplied by, or anticipated to be supplied by, a supplier associated with the supplier account 408. The example first product 410 data includes a capacity 412, a cost description 414, and attributes 416 of the first product. The first product 410 data may be stored separately from the supplier account 408, generated from available data accessible to the e-commerce platform 100 during operations of the supply association engine 302, provided in response to a query to the supplier device 154, and/or initiated by the supplier (e.g., based on a request provided through the supplier device 154). The product data 410 may form a part of a global product catalog.

The example supply association engine 302 determines candidate products 403 that are sufficiently close to the first product 410 to be matching products, determines one or more merchants associated with online stores 138 selling the matching products that, taken together, provide a stable volume base (e.g., demand) for the first product 410, and stores account associations 306 between the merchants associated with the online stores 138 selling the matching products and the supplier. Further details of operations to determine and store the account associations 306 are set forth throughout the present disclosure, and any such operations may be performed by a supply association engine 302 as schematically depicted in FIG. 4, including modifications to the specific example of FIG. 4 to implement specific implementations and variations of such operations as described throughout the present disclosure. The example of FIG. 4 is a non-limiting example that provides a schematic high level organization of the supply association engine 302 for clarity of description. For example, in certain embodiments, candidate products 403 may be any products of a respective set of products for sale at an online store 138 or otherwise associated with a merchant (e.g., available for sale on an associated merchant off-platform website 104), which may include all known products sold by the merchant, a screened/filtered set of known products sold by the merchant (e.g., screened based on an attribute of the products, or other criteria such as geographical locations, shipping information, preferences of a merchant and/or the supplier, etc.), products that the supply association engine 302 determines the merchant likely would sell if available (e.g., a product that a merchant may be expected to sell according to other products sold by the merchant, historical sales information associated with the merchant, and/or products sold by similarly positioned merchants), and/or a screened/filtered set of products that the supply association engine 302 determines the merchant likely would sell if available. For simplicity of the depiction of FIG. 4, attributes of the candidate products 403 are not depicted on FIG. 4, but may be available to (e.g., reference FIGS. 8, 9, and the related descriptions) the supply association engine 302 for certain operations herein, such as determining whether a candidate product 403 is a related product and/or a matching product with respect to the first product 410, as described throughout the present disclosure.

Figure 5:
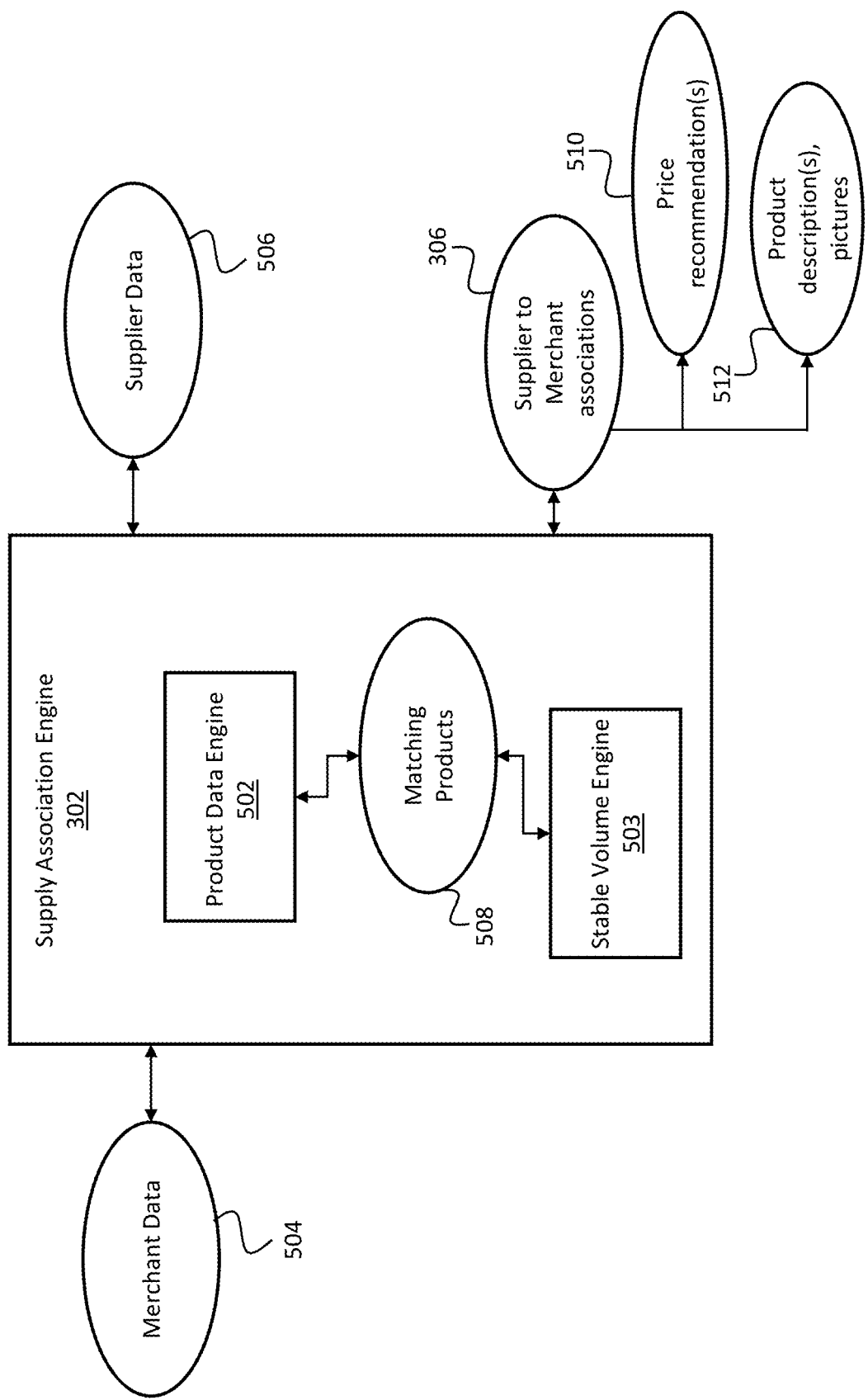
FIG. 5 is a schematic depiction of an embodiment of a supply association engine determining an association between a supplier account and merchant account(s).

Referencing FIG. 5, a schematic depiction of an example supply association engine 302 is provided to illustrate certain operations of the supply association engine 302 that may be performed in embodiments of the present disclosure. The example of FIG. 5 depicts the supply association engine 302 communicatively coupled to merchant data 504, which may include product data, merchant account information, associated online stores 138 and/or off-platform website 104 information, and the like. The example of FIG. 5 depicts the supply association engine 302 communicatively coupled to supplier data 506, which may include first product data, supplier account information, and the like. The example of FIG. 5 includes a product data engine 502 that performs operations to determine matching products 508 sold by online stores 138 and/or off-platform websites 104, and a stable volume engine 503 that performs operations to determine account associations 306 between the supplier account and merchants associated with the online stores 138 and/or off-platform websites 104 that provide for a stable volume demand for the first product. The example of FIG. 5 is a non-limiting example that provides a schematic high level organization of the product data engine 502 and stable volume engine 503 for clarity of description. Further details of operations to determine matching products 508, and to determine and store the account associations 306, are set forth throughout the present disclosure, and any such operations may be performed by a supply association engine 302, product data engine 502, and/or stable volume engine 503, as schematically depicted in FIG. 5, including modifications to the specific example of FIG. 5 to implement specific implementations and variations of such operations as described throughout the present disclosure.

Operations to associate the supplier account with merchant account(s) may be performed in any manner, for example a data value indicating the association may be included in data records associated with the supplier account and/or the merchant account, and/or a data record indicating account associations 306 may be stored in the e-commerce platform 100 in a data store 134 and/or distributed among a number of data stores. The account associations 306 may be general (e.g., the associated merchant account is generally associated with the supplier account), activity specific (e.g., the association 306 references one or more contexts such as purchasing a product, and/or determining a supplier for a product), product specific (e.g., the association 306 is utilized when the merchant is working with a specific product such as the matching product, the first product, and/or a related product), store specific (e.g., the association 306 is utilized for activity relevant to stores 138 and/or websites 104 associated with the merchant of the associated merchant account, such as those having a matching product).

Without limitation to any other aspect of the disclosure, the supply association engine 302 or other components of the e-commerce platform 100 utilize the account associations 306 to allow the supplier to supply the selected online stores (and/or off-platform websites) with the first product. Example aspects utilizing the account associations 306 include: preparing a purchase order of the first product from the supplier (e.g., a purchase order specific to a merchant, online store, and/or off-platform website; preparing a purchase order for the associated merchants, which may be a common purchase order for all of the associated merchants and/or a subset of the associated merchants; providing information to the merchant (e.g., transmitting to the merchant, storing with the merchant account, and/or storing a reference to the first product information with the merchant account) about the first product (e.g., pictures, descriptions, one or more attributes, a product page, etc.); prompting the merchant with supplier information and/or first product information during an operation of the e-commerce platform 100 (e.g., providing a default value for a field such as a supplier contact information field, product information, etc., during an operation by the merchant such as preparing a purchase order, fulfilling an order, fulfilling a drop shipped order, requesting supplier information, requesting product information, etc.); providing a product page for an online store and/or off-platform website for listing a product; and/or implementing a product page for an online store and/or off-platform website for listing a product). It can be seen that the utilization of the account associations 306 provides for efficient preparation of activities for the merchant related to the first product, allows for the merchant to leverage volume efficiencies of the first product with the supplier that are greater volumes than the merchant's own volume (e.g., pricing that may be improved based on the larger volume of the associated group); allows for the merchant to easily order or have orders placed on the merchant's behalf for the first product; allows for the merchant to rapidly integrate the first product into an online store and/or off-platform website, and to conveniently confirm that the first product is properly integrated; and/or provides a convenient contact point between the merchant and the supplier. It can be seen that the utilization of the account associations 306 provides numerous benefits for various activities of the supplier, including at least: providing a stable demand base for the first product of the supplier; providing for rapid development of an order base for the first product (e.g., related to a new introduction of the first product, and/or a change in specifications of a product where the changed product is the first product); providing for ease of listing a product with the e-commerce platform 100; and/or providing a convenient contact point between the supplier and associated merchants.

The example supply association engine 302 further determines price recommendations 510, for example a price for the first product from the supplier to the respective merchant, which, when present, may be stored as a part of the account associations 306, and/or may be referenced in the account associations 306. The price recommendations 510 may be communicated to the supplier and/or the associated merchant, for example to facilitate transactions between the supplier and merchant, thereby providing the supplier with a stable volume demand base for the first product, and/or providing the merchant with convenient and favorable supply terms for the first product. In certain embodiments, the price recommendation 510 provides the merchant with a pricing leveraged (or considered) with the volume of other merchants, for example where the stable volume demand base for the first product reduces the costs for the supplier to provide the first product (e.g., reference FIGS. 11-13 and the related description). In certain embodiments, the price recommendation 510 facilitates operations to request approval from the supplier and/or merchant before making the association (e.g., reference FIG. 23 and the related description), for example by providing the supplier and/or merchant with additional information that provides visibility to the value available by the association, and/or allows for the supplier and/or merchant to perform forecasting, cost planning, or other operations. In certain embodiments, the price recommendation 510 provides a cost function, or a portion of a cost function, to allow for the supply association engine 302 to perform continuous improvement operations in monitoring and/or updating the account associations 306—for example the price recommendations 510 may be a part of a value function for the account associations 306, allowing for iterative improvement, machine learning operations, or other improvement mechanisms on the account associations 306 over time (e.g., improving value to the supplier with a larger and/or more stable volume demand base, and/or improving value to merchants with better product matching, reduced transactional costs for a greater number and/or quantity of sold products, and/or reducing acquisitional costs of supplied products). In certain embodiments, the price recommendation 510 includes a consideration of shipping costs that may be relevant to the associated merchant, such as shipping locations (e.g., known, estimated, or likely), package weight/sizes to meet the shipping requirements of the merchant (e.g., order timing, volume, batch sizes of shipped first products, etc.).

Operations to determine the respective pricing (e.g., a price for each of the associated merchants for the first product) include operations such as: determining the respective pricing as the supplier price for the first product (e.g., based on the price 414 description, reference FIGS. 13-14 and the related description); and/or determining the respective price based on the volume contribution of the merchant to the stable volume demand (e.g., apportioning a price benefit achieved by the volume of the associated group based on their combined total volume relative to an increased price if a lower volume was being purchased). For example, the price benefit achieved may be the area above a price-volume curve relative to an initial low volume price (e.g., reference FIG. 13, where volumes within the ramp portion and/or lower flat portion have an area thereabove relative to a flat price at the lower volume flat portion; or reference FIG. 14 where volumes above the lowest price point value have an area thereabove that at least notionally represents a price benefit achieved at the respective volume). In the example, apportioning the price benefit can include any operation such as tiered pricing for the merchant based on volume thresholds, weighted pricing based on a specific merchant volume relative to the total volume (e.g., if a specific merchant provides 10% of the group volume, then the apportionment of the price benefit is based on 10%, but may be higher or lower—where higher apportionments provide an incentive for a merchant to increase sales volumes, and lower apportionments provide for a flatter and/or more consistent price across the merchants). The respective pricing may be a price for the merchant (e.g., a price that defines what the merchant will pay for the first product from the supplier), and/or a recommended pricing (e.g., a pricing recommended for the merchant, that may be provided as a default value or suggested value for a purchase order, a value provided when requesting approval for the association such as operation 2302 depicted on FIG. 23).

The example supply association engine 302 further provides product descriptions 512 and/or product pictures 512. The product descriptions 512 and/or product pictures 512 may be transmitted to the merchant device 102 and/or merchant off-platform website 104, and/or may be provided as stored data (e.g., in the product data 304, online store 138, and/or otherwise made available for access to the merchant) at least intermittently available to the merchant for access. The utilization of product descriptions 512 and/or product pictures 512 allow for a number of technical improvements, including facilitating operations to request approval from the supplier and/or merchant before making the association (e.g., allowing the supplier and/or merchant to confirm the first product with readily available information at the point of decision), facilitating implementation of the first product into an online store 138 and/or off-platform website 104, and/or facilitating certain automated operations such as providing the first product for sale on the online store 138 and/or updating a product for sale from the matching product to the first product (e.g., where the matching product and the first product may have some difference that does not disqualify the equivalence of the matching product with the first product, but nevertheless has a change in some attribute displayed to the customer that is updated when updating to the first product, such as a product picture, view of the product, packaging of the product, etc.).

Figure 6:
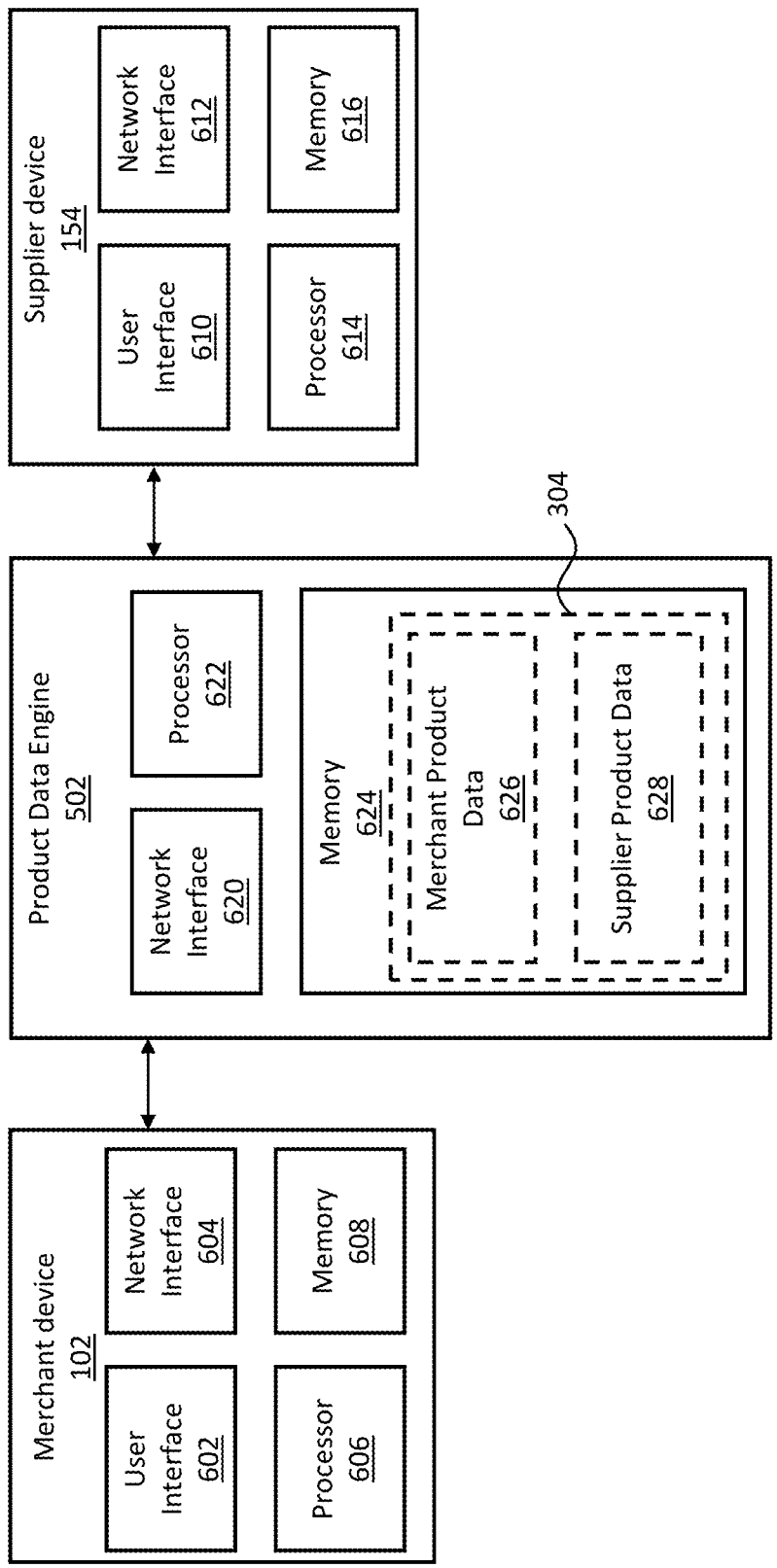
FIG. 6 is a schematic depiction of an embodiment of a product data engine.

Referencing FIG. 6, an example product data engine 502 is schematically depicted in communication with the merchant device 102 and the supplier device 154. Communications between the product data engine 502 and the devices 154, 102 may be intermittent and/or selectively available (e.g., controlled and/or requested by the devices 102, 154, 502 depending on the operating condition of the e-commerce platform 100, the devices 102, 154, 502, and/or the operations being performed). Communications between the devices 102, 154, 502 may be performed via intermediate operations, such as mutual access to an available data store or the like. The example merchant device 102 includes a user interface 602, which may be at least partially provided by and/or operated by the e-commerce platform 100, and a network interface 604 providing communicative coupling between the merchant device 102 and the product data engine 502. The example merchant device 102 includes a processor 606 resource configured to functionally execute operations of the merchant device 102, and a memory 608 configured to store data related to the merchant device 102. The example merchant device 102 is depicted as a single device for clarity of description, but the merchant device 102 may be a distributed device, and/or one of a number of devices that may be distinct devices at different times, different operating conditions, and/or for certain operations of the system. The example supplier device 154 includes a user interface 610, which may be at least partially provided by and/or operated by the e-commerce platform 100, and a network interface 612 providing communicative coupling between the supplier device 154 and the product data engine 502. The example supplier device 154 includes a processor 614 configured to functionally execute operations of the supplier device 154, and a memory 616 configured to store data related to the supplier device 154. The example supplier device 154 is depicted as a single device for clarity of description, but the supplier device 154 may be a distributed device, and/or one of a number of devices that may be distinct devices at different times, different operating conditions, and/or for certain operations of the system. The example product data engine 502 includes a network interface 620 that provides communicative coupling between the merchant device 102 and the supplier device 154 with the product data engine 502, and further provides communicative coupling between the product data engine 502 and other components of the e-commerce platform 100 (e.g., data store 134, product data 304, other components of the supply association engine 302, online stores 138, off-platform websites 104, etc.). The example product data engine 502 includes a processor 622 configured to functionally execute operations of the product data engine 502, including at least operations to determine attributes of the first product, to determine candidate products, to determine related products, and/or to determine matching products, as set forth throughout the present disclosure. The example product data engine 502 includes a memory 624 configured to store data related to the product data engine 502, including at least product data 304 such as merchant product data 626 and/or supplier product data 628 (e.g., product data associated with the first product). The example product data engine 502 is depicted as a single device for clarity of description, but the product data engine 502 may be a distributed device, included in whole or part within other components of the e-commerce platform 100 (e.g., the supply association engine 302, product data 304, data store 134, etc.). In certain embodiments, the example product data engine 502 and/or portions thereof may be positioned on a merchant device 102 and/or supplier device 154, which may include being positioned, in whole or part, on the devices 102, 154 during certain operating conditions and/or during certain operations, and not positioned, in whole or part, on the devices 102, 154 during other operating conditions and/or during other operations.

Figure 7:
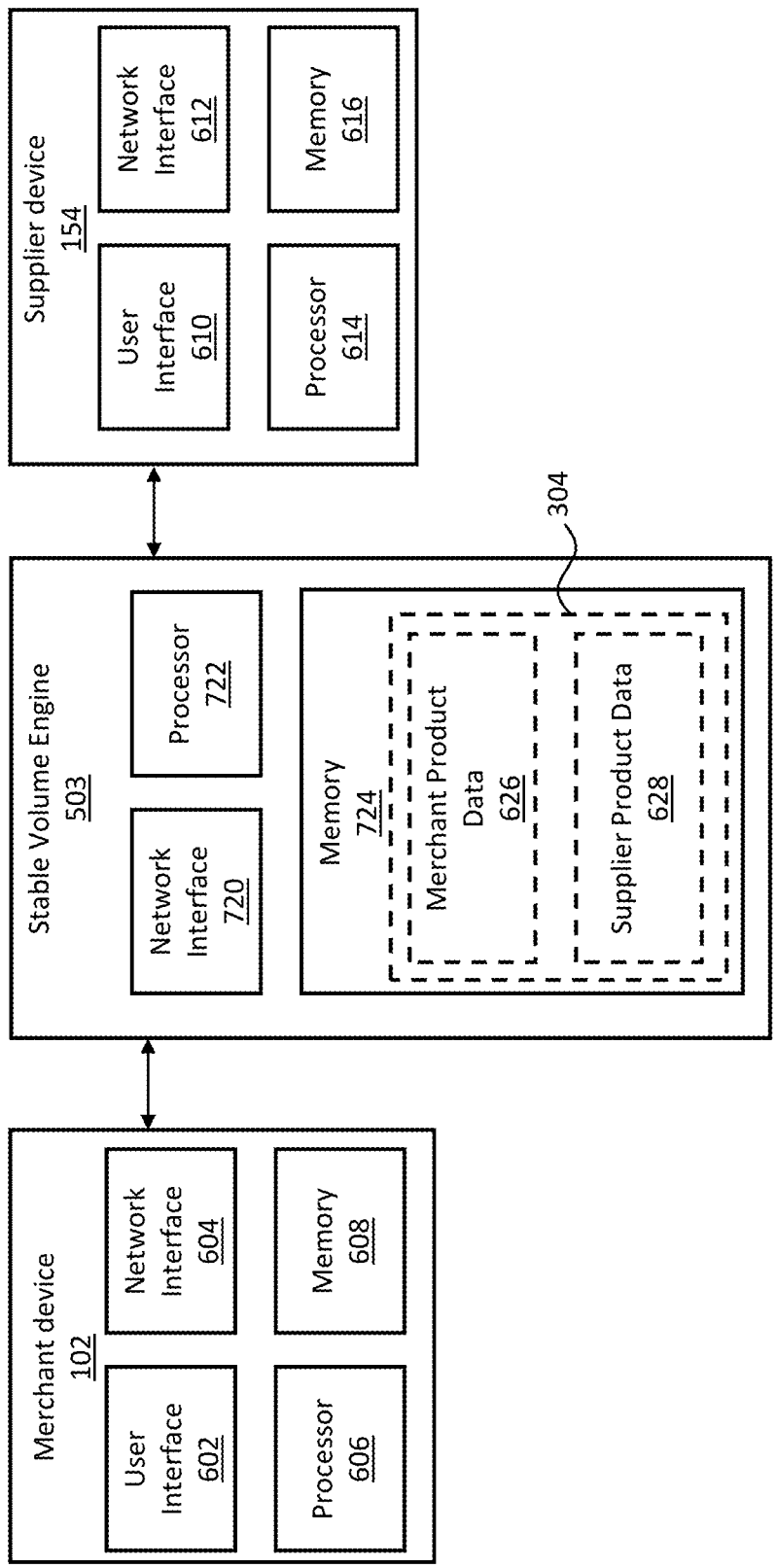
FIG. 7 is a schematic depiction of an embodiment of a stable volume engine.

Referencing FIG. 7, an example stable volume engine 503 is schematically depicted in communication with the merchant device 102 and the supplier device 154. Communications between the stable volume engine 503 and the devices 154, 102 may be intermittent and/or selectively available (e.g., controlled and/or requested by the devices 102, 154, 503 depending on the operating condition of the e-commerce platform 100, the devices 102, 154, 503, and/or the operations being performed). Communications between the devices 102, 154, 503 may be performed via intermediate operations, such as mutual access to an available data store or the like. The example merchant device 102 includes a user interface 602, which may be at least partially provided by and/or operated by the e-commerce platform 100, and a network interface 604 providing communicative coupling between the merchant device 102 and the stable volume engine 503. The example merchant device 102 includes a processor 606 resource configured to functionally execute operations of the merchant device 102, and a memory 608 configured to store data related to the merchant device 102. The example merchant device 102 is depicted as a single device for clarity of description, but the merchant device 102 may be a distributed device, and/or one of a number of devices that may be distinct devices at different times, different operating conditions, and/or for certain operations of the system. The example supplier device 154 includes a user interface 610, which may be at least partially provided by and/or operated by the e-commerce platform 100, and a network interface 612 providing communicative coupling between the supplier device 154 and the stable volume engine 503. The example supplier device 154 includes a processor 614 configured to functionally execute operations of the supplier device 154, and a memory 616 configured to store data related to the supplier device 154. The example supplier device 154 is depicted as a single device for clarity of description, but the supplier device 154 may be a distributed device, and/or one of a number of devices that may be distinct devices at different times, different operating conditions, and/or for certain operations of the system. The example stable volume engine 503 includes a network interface 720 that provides communicative coupling between the merchant device 102 and the supplier device 154 with the stable volume engine 503, and further provides communicative coupling between the stable volume engine 503 and other components of the e-commerce platform 100 (e.g., data store 134, product data 304, other components of the supply association engine 302, online stores 138, off-platform websites 104, etc.). The example stable volume engine 503 includes a processor 722 configured to functionally execute operations of the stable volume engine 503, including at least operations to determine volume characteristics of the first product (e.g., capacity information, volume-pricing information, etc.), as set forth throughout the present disclosure. The example stable volume engine 503 includes a memory 724 configured to store data related to the stable volume engine 503, including at least product data 304 such as merchant product data 626 and/or supplier product data 628 (e.g., product data associated with the first product). The example stable volume engine 503 is depicted as a single device for clarity of description, but the example stable volume engine 503 may be a distributed device, included in whole or part within other components of the e-commerce platform 100 (e.g., the supply association engine 302, product data 304, data store 134, etc.). In certain embodiments, the example stable volume engine 503 and/or portions thereof may be positioned on a merchant device 102 and/or supplier device 154, which may include being positioned, in whole or part, on the devices 102, 154 during certain operating conditions and/or during certain operations, and not positioned, in whole or part, on the devices 102, 154 during other operating conditions and/or during other operations.

Figure 8:
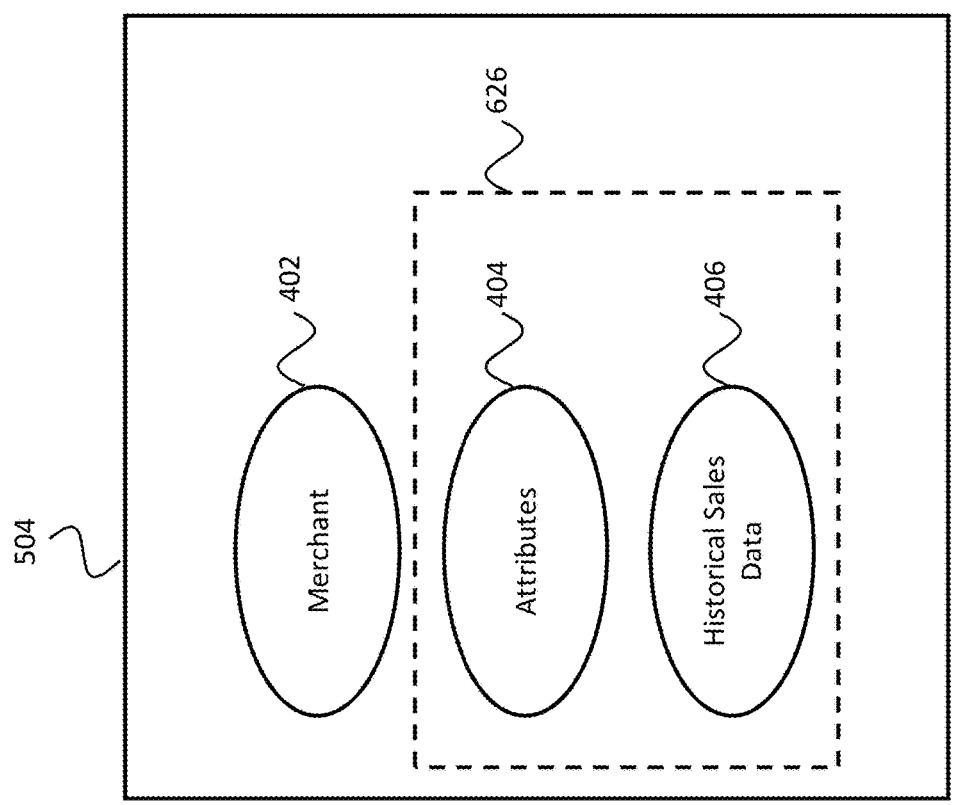
FIG. 8 is a schematic depiction of merchant data according to certain embodiments of the present disclosure.

Determining Whether a Merchant Product or Candidate Product is a Matching Product to the First Product of the Supplier Referencing FIG. 8, example merchant data 404 is depicted, for example as utilized by the supply association engine 302 (e.g., reference FIG. 5 and the related description). The example merchant data 504 includes merchant information 402, such as a merchant identifier, entity name(s) for the merchant, associated online stores 138 for the merchant, associated off-platform website 104 information for the merchant, contact information, network/internet addresses for the merchant, merchant preferences (e.g., contact parameters, subscriptions, and/or unit preferences such as currency types), and the like. The merchant data 504 may include data entered by the merchant (e.g., through the user interface 602) and/or data collected about the merchant (e.g., from transactions, publicly available information, operations performed with the e-commerce platform 100, etc.). The example merchant data 504 includes merchant product data 626 for the merchant, such as product attributes 404 and/or historical sales data 406 for products. The merchant product data 626 may additionally or alternatively include information such as online stores 138 and/or off-platform websites 104 associated with the merchant product data 626, product identifiers, etc. The example of FIG. 8 depicts product information 626 for a single product for clarity of description, but the product information 626 may include data about a set of related products, information about a selected subset of products for the merchant, information about recently sold products by the merchant, and/or information about all products known to be associated for the merchant.

Referencing FIG. 9, an example data record is schematically depicted illustrating an example of merchant data 504, with the example showing a subset of the merchant data 504 related to the merchant product data 626. The example of FIG. 9 depicts a merchantID field 402 identifying the merchant, product attributes 404 depicting selected attributes for each product, and sales data 406 depicting sales of each product. In certain embodiments, associations between the merchant information 402 with online stores 138 for the merchant and/or associated off-platform website 104 information for the merchant may be included in the merchant data 504, but is omitted in FIG. 9 for clarity of the description. The example attributes 404 are not comprehensive, and any attributes known about a product may be included. In certain embodiments, the merchant data 504 includes a subset of all available attributes, such as attributes that are utilized to determine whether candidate products 403 are matching products and/or related products relative to the first product. The sales data 406 includes historical sales data in any format, and may additionally or alternatively include processed sales data (e.g., moving averages, time sampled data, statistical descriptions, predictive values for future time periods, compressed data, summarized data, and/or gap-filled values where data is believed to be missing, etc.). The data record of FIG. 9 is a schematic depiction of merchant product data 626 utilized in certain embodiments, but the data such as that depicted in the data record may be stored in an alternate format (e.g., in a number of separate data records, in a relational database, etc.), stored wholly or partially in separate locations within the e-commerce platform 100, generated during operations of the supply association engine 302 (e.g., which may then be stored for future reference, for utilization by other components of the e-commerce platform 100, and/or discarded after operations for a given execution cycle of the present disclosure are concluded).

For each store (e.g., online store 138 and/or merchant off-platform website 104) associated with a merchant account on the e-commerce platform 100, the e-commerce platform 100 stores a respective catalog of products. Each product has a set of attributes that are stored in relation to the product, e.g. as data 134 in memory. The merchant may view the catalog of products for each store and the corresponding set of attributes of each product sold in each store using a user interface on their merchant device 102.

The set consisting of every product that is for sale by the merchant in one or more of the merchant's stores will be referred to as the global collection of products. In some embodiments, the e-commerce platform 100 implements a global data model that stores for each merchant: (1) an indication of each product in the global collection of products, (2) an indication of in which ones of the merchant's stores the product is offered for sale, and (3) an indication of which attributes of that product are the same across the different stores in which that product is offered for sale and/or an indication of which attributes of that product are different across the different stores in which that product is offered for sale.

In certain embodiments, the e-commerce platform 100 determines product attributes for only a subset of merchant products, such as candidate products 403, and/or for a subset of products relating to merchants that may be relevant to the first product 410 (e.g., potentially selling similar products, having an overall volume sufficient to warrant a determination whether the merchant has matching products 508, etc.). In certain embodiments, the e-commerce platform 100 considers the global collection of products as candidate products 403.

In some embodiments, the product data engine 502 implements a product matching algorithm that, for each merchant, traverses the product catalog of each store belonging to the merchant to identify a matching product 508 to the first product 410. An example product data engine 502 identifies a matching product 508 from the candidate products 403 by comparing information of an attribute 416 of the first product 410 with a corresponding attribute 404 of the candidate products 403, such as a matching product ID, SKU, title, description, etc. An example product data engine 502 identifies a matching product 508 from each candidate product 403 by comparing information of more than one attribute 416 of the first product 410 with corresponding attributes 404 of the candidate product 403, for example a matching product ID, SKU, title, description combined with another one of these, and/or with one or more other confirming attributes such as dimensions, weight, color, etc. An example product data engine 502 identifies a candidate product 403 as a related product to the matching product 508 based on comparing an attribute 416 (and/or more than one attribute) of the first product 410 with corresponding attribute(s) 404 of each candidate product 403. In certain embodiments, the product data engine 502 provides the related products as matching products 508 for further consideration, for example to determine whether the associated stores of the merchant have a stable volume demand of the related products, and/or whether the associated stores of the merchant contribute to an aggregate stable volume demand for a sub-set and/or group of merchants. In certain embodiments, the product data engine 502 utilizes the related products to filter, screen, and/or reduce the number of candidate products 403, and performs further operations to determine whether the related products are deemed to be matching products 508 (e.g., checking against further attributes of the related products). In certain embodiments, the product data engine 502 provides the related products as complementary products and/or accessories for a product—for example, a toothbrush as a product, and toothpaste as a complementary product. In certain embodiments, the determination that a candidate product 403 is a related product is utilized to determine whether another candidate product 403 (e.g., sold by the same store and/or merchant) is a matching product 508 (e.g., if a first candidate product 403 is thought to be a yoga mat, a second candidate product 403 sold by the same merchant that is known to be a yoga mat carrying case can be utilized to improve the confidence that the first candidate product 403 is actually the yoga mat), to provide information to the store and/or merchant having the matching product 508 (e.g., listing the first product 410 in a catalog or memory location near the related product; and/or providing a picture and/or description of the related product with the picture and/or description provided of the first product 410).

In certain embodiments, for example where the product data engine 502 determines matching products 508 based on more than one attribute 416 of the candidate products 403, the product data engine 502 may perform operations such as indexing the candidate products 403 (e.g., based on selected attributes, merchants, stores, sales volume, etc.), performing attribute checks in a selected order (e.g., utilizing faster checks first, such as checks that require lower data processing and/or memory to complete; and/or utilizing more selective checks first that are likely to eliminate a larger fraction of candidate products 403 from further consideration, such as a product ID, SKU, or the like). In certain embodiments, the product data engine 502 may access a data store having product matches determined between products of the global product catalog, for example stored as a relationship in the global product catalog that the products are the same product, such as in a global data model. Examples of a global product catalog and a global data model can be found in U.S. patent application Ser. No. 16/841,912, entitled "SYSTEMS AND METHODS FOR DISPLAYING GLOBAL PRODUCT DATA", and filed on Apr. 7, 2020, which is incorporated herein by reference in the entirety for all purposes. The examples of the a global product catalog and a global data model disclosed in the aforementioned application include aspects as may be relevant to understanding of the present disclosure, Where the product data engine 502 accesses relationships in the global product catalog, the product data engine 502 may determine whether just one of the group of products marked as the same product in the global data model are the same, and if the just one of the group of products is determined to be a matching product 508, the product data engine 502 may determine that all of the group of products marked as the same product in the global data model are matching products 508. In certain embodiments, where not all of the group of products marked as the same product in the global data model are candidate products 403 (e.g., where a product is screened for another reason, such as a product that is no longer being sold by a merchant or associated store), the portion of the group of products marked as the same product in the global data model may be omitted from the matching products 508. It can be seen that the operations of the product data engine 502 provide for high confidence operations that matching products 508 will fulfill the needs of the merchant and/or supplier, and can reduce computing resources, memory resources, and other system resources to support operations to determine matching products, and downstream operations, such as to determine whether the matching products 508 have stable sales volumes, and to determine a group of merchant accounts to associate with the supplier account and thereby provide a stable volume demand for the supplier.

In some embodiments, a candidate product 403 is a matched product 508 if it shares selected corresponding attributes that are exactly the same with the first product 410. In some embodiments, a candidate product 403 is a matched product 508 if one or more particular corresponding attributes are exactly the same, e.g. if the SKU number of the candidate product 403 is exactly the same as the SKU number of the first product 410. In some embodiments, a candidate product 403 is a matched product 508 if certain corresponding attributes, a number of certain corresponding attributes, and/or a certain percentage of corresponding attributes are an exact match, e.g. if the title, description, and color are an exact match between the candidate product 403 and the first product 410.

In some embodiments, the product data engine 502 selects the first product 410 and associated attributes, and then traverses each product in each catalog (e.g., a catalog of all products for a given online store 138, off-platform website 104, and/or associated with a particular merchant) and assigns a score to each product based on how similar the attributes of that product are to the first product 410. A score equal to or above a certain threshold (e.g. a score of 95 out of 100 or above, or a number equal to or above a certain threshold of corresponding attributes equal to each other) indicates the considered product is a matching product 508. In some embodiments, a score within a particular range results in a determination that the considered product may be a related product (e.g., which may be considered based on further attributes, and which may be determined after determining whether the considered product may contribute to a merchant association 306 based on stable volume demand). In some embodiments, a score below a threshold indicates the considered product is not a matching product 508, and the considered product is removed from further consideration. In certain embodiments, partial matches, intermediate score values, and/or related products may be stored for future utilization—for example review by an administrator to review potential matches, which data may then be utilized as training data for the product data engine 502, to correct erroneous information in a data store (e.g., a catalog, an attribute, etc.), and/or to utilize any matching information in an update operation to the account associations 306 (e.g., reference FIG. 24, operation 2404 and the related description).

Example operations of the product data engine 502 to score similarity between candidate products 403 and the first product include 410 include: 1) counting the number of corresponding attributes equal to each other, where the score may be proportional to the percentage of attributes equal to each other; 2) weighting particular attributes (e.g., important attributes, highly determinative attributes, highly selective attributes, etc.) and/or combinations of attributes in the score contribution; for example, if the title and description are exact matches, the score may be increased significantly as the candidate product 403 and first product 410 have a high likelihood to be a match; thus, while many attributes may be compared, the score may be highly dependent upon particular attributes, and/or correlating information between a small number of attribute comparisons; and 3) text entry differentials between corresponding attributes may contribute to the score, for example if the description of the candidate product 403 and the first product 410 differs by only a single word or single phrase, the score may be positively impacted; depending upon the word, for example negating words differentials such as "not", "without", etc., and/or recognized characterizing words such as "720p", "lithium-ion", may reduce the impact of the otherwise closely matching attribute, or even have a significant negative impact on the score depending upon the nature of the attribute (e.g., where the difference of the word or phrase is a strong indicator that candidate product 403 and first product 410 are not the same in a particular context).

In certain embodiments, the product data engine 502 computes a matching score by comparing only certain corresponding attributes (e.g., title, description, images, color, SKU, vendor, meta-fields such as key value pairs defined by a merchant, store, or application, e.g., yoga mat surface texture). In certain embodiments, the product data engine 502 accounts for certain types of difference between corresponding attribute values, e.g., due to cultural differences between different countries, likely typographical errors, and/or terms of art or jargon relative to the supplier versus the merchant and/or store associated with the candidate product 403. For example, the title of the candidate product 403 in the U.S. store may be "summer yoga mat", but the title of the first product 410 for a supplier in Canada may be "summer yoga matt" due to a typographical error. As another example, the description of the candidate product 403 in the U.S. store may be exactly the same as the description of the first product 410 from the Canada store, except that the description in the Canada store may use "knapsack" instead of "backpack", or "colour" instead of "color", etc. Therefore, in some embodiments the scoring method factors in differences between string values of corresponding attributes and computes a higher score if there are only minor differences between the string text of corresponding attributes. The difference between two corresponding attributes that are each represented as strings of text may be computed as the Levenshtein distance. Simply put, the Levenshtein distance between a pair of strings can be defined as the minimum number of single-character edits (e.g., insertions, deletions, substitutions) required to change a first string of the pair into the other string of the pair. For example, if the title of the candidate product 403 in the U.S. store and the title of the first product 410 from the Canada supplier only differ by one or two characters (e.g. due to a typo in the title of the product in the Canada store), then the Levenshtein distance between those two titles would be small, which may result in higher score value.

In some embodiments, the product data engine 502 may automatically account for known differences between corresponding attributes between merchants/stores and the supplier. For example, converting between imperial vs. metric measurements to ensure that the same measurement unit is compared across different stores, e.g. if the product dimension is 1 foot×1 foot for the candidate product 403 in the U.S. store, and the product dimension is 30 cm×30 cm for the first product 410 from the Canada supplier, then the product dimension attribute values may be determined to be equal to each other (since 1 foot approximately converts to 30 cm, depending on the nature of the attribute and the context of the product). As another example, currency conversion may be applied to ensure a consistent currency is being compared between the merchant/store and the supplier. As another example, machine translation of language may be applied to ensure a consistent language is being compared across different stores, e.g. the title of the candidate product 403 in a France store is converted to English and then compared to the title of the first product 410 from a U.S. supplier.

The product data engine 502 may employ a threshold value in determining whether a given score value indicates a match. For example, in some embodiments, the product data engine 502 determines a score value of 0.8 (e.g., normalized 0-1) indicates the candidate product 403 is considered a matching product 508. In some embodiments, the product data engine 502 determines a score value of 0.6 (e.g., normalized 0-1) or lower indicates the candidate product 403 is considered not to be a matching product 508. In some embodiments, the product data engine 502 determines a score value between 0.6 and 0.8 (e.g., normalized 0-1, inclusive for the present example) is considered an indication that: the candidate product 403 is considered a related product, that the candidate product 403 and first product 410 should be reviewed by an administrator, and/or that the candidate product 403 is not considered to be a matching product 508. The recited examples are illustrative and non-limiting.

An example product data engine 502 determines whether a candidate product 403 is a matching product 508 by performing: utilizing the SKU (or other product ID) as a "hard" requirement, e.g. find all matching SKUs from candidate products 403. For example, if the SKU of a candidate product 403 for sale in a store is the same as the SKU for the first product 410, then the product date engine 502 determines the candidate product 403 is a matching product 508.

Example and non-limiting example product data engine 502 embodiments perform one or more of the following operations to determine whether a candidate product 403 is a matching product 508. Each of the following operations may be performed, in addition to or as an alternative to any other operations set forth in the present disclosure, and may be included in whole or part with any other aspects of the present disclosure:

Determine a difference between some or all corresponding attributes between the candidate product 403 and the first product 410, and if the number of same attributes is above a threshold X, determine that the candidate product 403 is a matching product 508.

Allow the supplier to configure the matching algorithm utilized by the product data engine 502. For example, the user interface 610 may be operated to allow the supplier to apply a configuration such as: indicate the matching product 508 when SKU1=SKU2 or when (Title1=Title2 AND VariantCount1=VariantCount2). In the example SKU1 is the SKU of the candidate product 403, and SKU2 is the SKU of the first product 410. Further to the example, VariantCount2 is the number of product variants that the first product 410 has available. Further to the example, where a supplier configures one or more aspects of the matching algorithm, information about other suppliers and/or information about potentially matching merchants, are not provided to the supplier (e.g., pricing, sales volumes, the fact of sales of a matching product, etc.).

Allow the supplier to configure progressive matching rules, such as: a first pass match based on SKU only (e.g., either passing or failing can be determinative or indicate further checks, for example determinative passing indicates the candidate product 403 is a matching product 508, while non-determinative passing indicates the candidate product 403 should continue in the match checking process); second pass match based on additional rules (e.g., if (SKU or Title) equals the same then pass the match); and a third pass to find products based on a more complex scoring, etc. The number of pass matches can be any selected number, and the nature of passing/failing a given pass match (e.g., determinative of a match or non-match, passing to a later check stage, etc.) is further configurable.

Additionally or alternatively, the example product data engine 502 may allow a merchant to configure the matching algorithm utilized by the product data engine 502, which may be utilized in addition to or as an alternative to supplier criteria, at least with regard to candidate products 403 associated with a store of the merchant. Additionally or alternatively, the example product data engine 502 may allow an administrator of the e-commerce platform 100 to configure the matching algorithm utilized by the product data engine 502, which may be utilized in addition to or as an alternative to any other matching operations performed by the product data engine 502. Further to the example, where a merchant configures the matching algorithm, the merchant may provide information that can be utilized to determine if matching products are available, without information regarding products to be offered (e.g., the merchant lists product information that would be of interest if supplied, but without knowledge of whether a matching product is available for supply). In another example, where a merchant configures the matching algorithm, the merchant may be provided information regarding products offered for supply, for example where a supplier has listed a product on the platform, and/or provided a consent for information about offered products to be provided to merchants. In certain embodiments, information about products offered may omit certain information (e.g., prices, volumes, etc.) and/or may be limited to certain information (e.g., according to a supplier consent or configuration, text descriptions, SKUs, images, etc.).

Without limitation to any other aspect of the present disclosure, a product attribute 404, 416 includes any one or more of the foregoing: a title, a description, long and/or short forms of the title and/or description, a color, a size, a dimension, a weight, a packaging description (packaging type, size, quantity, etc.), a vendor, a brand name, a product material, an image (and/or selected views), an inventory value (e.g., units in stock, availability date, etc.), an SKU, a product ID (e.g., a vendor, merchant, store, supplier, and/or industry provided ID), and/or a price.

Determining Whether a Matching Product has a Stable Demand

Figure 10:
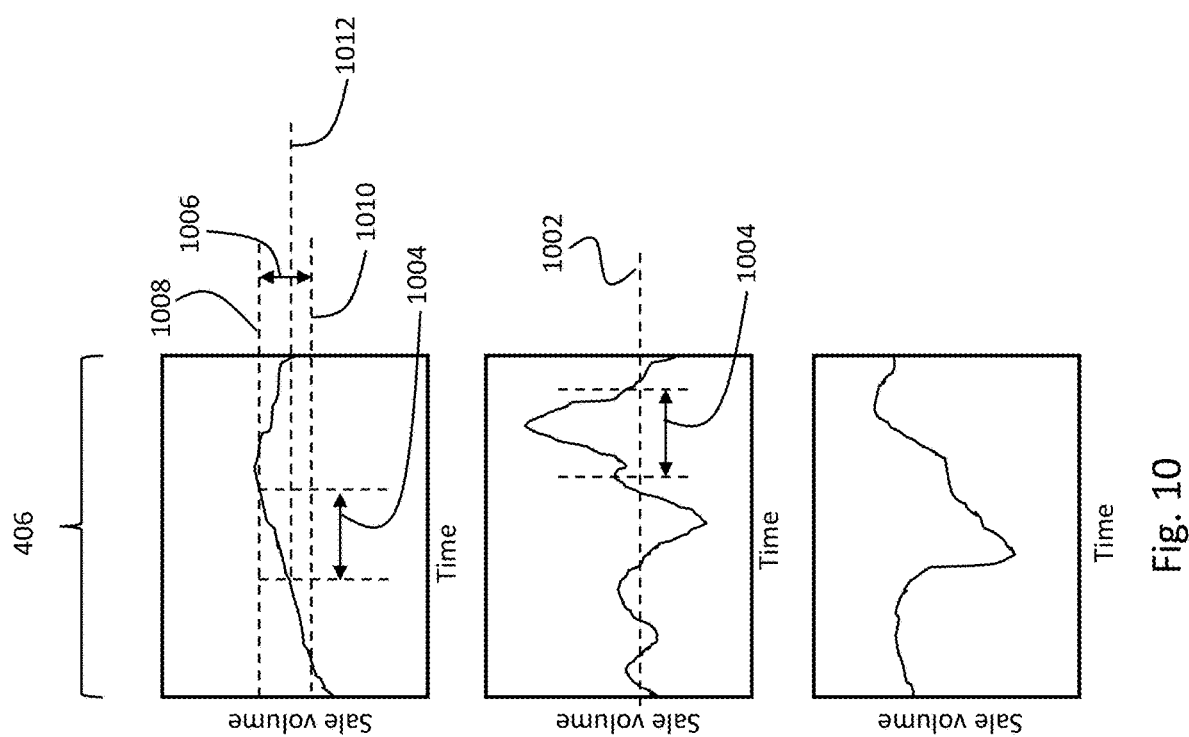
FIG. 10 is a depiction of illustrative historical sales data according to certain embodiments of the present disclosure.

Referencing FIG. 10, illustrative data for historical sales data 406 are depicted. In certain embodiments, the stable volume engine 503 utilizes the historical sales data 406 to determine whether a matching product 508 has a stable sales volume, or stable demand, for those products. The determination of a matching product 508 having a stable demand may be determined for an individual merchant or online store 138, for example where an individual online store 138 has a stable demand for the matching product 508. In certain embodiments, the determination of a matching product 508 having a stable demand may be determined for an aggregated group of merchants or online stores 138. All descriptions throughout the present disclosure of determining a stable demand contemplate consideration of individual merchants or online stores 138, grouped sub-sets of merchants or online stores 138, and/or consideration of an entire selected group of merchants or online stores 138. The historical sales data 406 may be determined from transactions related to a retailer, merchant, store, or website associated with the e-commerce platform 100, according to available external data (e.g., website traffic, and/or a third-party data source such as a subscription service), and/or determined from data stored within or associated with the merchant account. An example stable volume engine 503 determines that a matching product 508 has a stable demand responsive to the product having stable sales of the matching product 508 over a defined period 1004. The stable sales may be a threshold amount of sales (e.g., exceeding a given sales figure, not falling below a given sales figure, and/or having a low rate of change for the period). An example stable volume engine 503 determines that a matching product 508 has a stable demand responsive to a sales volume over a threshold 1002 for a determined period 1004. An example stable volume engine 503 determines that a matching product 508 has a stable demand responsive to a sales volume varying by less than a defined amount within the defined period 1004, for example not exceeding an upper bound 1008 or falling below a lower bound 1006 relative to a defined baseline 1012, and/or variance within a range 1006 (which matches the upper bound 1008 and lower bound 1006 in the example of FIG. 10, but need not match these bounds). In the example, the sales volume data may include a moving average sales volume, a filtered sales volume, bucketed sales volumes (e.g., binned data and/or a histogram, with bin sizes of daily, weekly, monthly, etc.), or any other sales volume description. In certain embodiments, the sales volume references units of sale (e.g., quantity of sales), but may utilize any other sales description parameter such as sale value (e.g., to allow for accounting for the value of the sales in determining acceptable stable volume demands). In certain embodiments, more than one stable volume demand criteria may be applied, and defined times 1004 for different criteria may be distinct—e.g., a first defined time 1004 for a floor sales threshold 1002, and a second defined time 1004 for a rate of change threshold (e.g., bounding range 1006). The determined group of associated merchants for the account associations 306 may be determined by one or more of the following operations: including all merchants having a stable volume demand (subject to a capacity 412 limitation for the supplier); adding merchants in order of volume demand stability of the matching products; adding merchants in order of volume demands of the matching products (subject to added merchants having sufficiently stable volume demand, contributing to an aggregated stability of volume demand, and/or not reducing an aggregated stability of volume demand), adding merchants as a sub-set of merchants contributing to a volume demand stability, adding merchants according to a volume demand stability to a sub-set or group of merchants, and/or combinations of these.

In certain embodiments, the stable volume engine 503 determines whether a matching product 508 has a stable demand responsive to an aggregated volume between a number of merchants. For example, historical sales volumes or other data described throughout the present disclosure may be aggregated between a group of merchants, and/or a group of merchants may be constructed such that the aggregated group together provides a stable demand for the respective matching products 508 associated with each merchant of the aggregated group. In certain embodiments, the stable volume engine 503 determines the stable demand corresponding to the aggregated group responsive to historical sales data 406, including for example seasonal data, longitudinal data, time-wise distribution of sales events of the matching products 508, and the like. In certain embodiments, the stable volume engine 503 performs statistical modeling of sales for members of the aggregate group of merchants, for aggregated sub-sets of the aggregate group of merchants, and/or for the entire aggregate group of merchants, such as determining polynomial fits of sales data to historical sales data 406, Poisson distribution modeling of historical sales data 406, statistical descriptions of historical sales data 406 (e.g., as inputs to a simulation such as a Monte Carlo simulation or the like), and/or combinations of these. In certain embodiments, sub-sets of the candidate merchant group may be aggregated first and modeled together, for example where a sub-set of merchants have conflicting variability (e.g., to produce a sub-set of the merchants having inherently lower variability therebetween), have cooperating variability (e.g., to produce a sub-set of the merchants having a similar variability match, to allow for treatment together as a variance group), have a target volume of the matching products 508 therebetween (e.g., an average sales volume over a time period), and/or have a conflicting or cooperating aspect to their sales volumes (e.g., calendar date sales response variability, event driven sales response variability, etc.). It can be seen that the aggregation of merchants into merchant groups can provide for the production of a merchant group having a more stable demand than a group of merchants considered individually, where the more stable demand corresponds to one or more of a stable number of sales units per selected time period, a more stable floor value (e.g., sales not falling below a given sales rate), a more stable peak value (e.g., sales occurring statistically closer to a peak sales rate, and/or sales less likely to exceed a peak sales rate), a lower sales rate variability (e.g., a rate of change of absolute sales volume, floor fluctuation, and/or peak fluctuation), and/or a reduced sensitivity for any of the foregoing. It can be further seen that aggregation of sub-sets of the candidate merchant group before aggregation of a full group of merchants comprising a stable sales volume can provide numerous benefits in determining the full group of merchants, including without limitation: reduction of modeling time; reduction in memory utilization; reduction in processor resources; reduced time and/or resources to re-configure the full merchant group in response to changes in sales characteristics for individual merchants; increased ability to meet stability criteria both qualitatively (e.g., the types of stability achievable, such as average volumes, sales sequencing, minimum volumes, and/or peak volumes) and quantitatively (e.g., achieving a tighter constraint and/or reduced sensitivity for a given type of stability); and/or consideration of a larger group of merchants. Without limitation to any other aspect of the present disclosure, the consideration of a larger group of merchants allows for: a greater range of stable sales volume targets to be achieved; a greater number of merchants to realize the benefits of aspects of the present disclosure; and/or greater exposure of a supplier to a range of retailers and merchants.

In certain embodiments, the stable volume engine 503 may further consider external data in determining whether a merchant, online store 138, off-platform website 104, sub-groups of these, and/or the aggregated group of these, has a stable volume demand. For example, the stable volume engine 503 may utilize one or more of: trending data (e.g., of terms from the first product title, description, product category, etc.) to determine whether the first product is likely to experience an overall increase or decrease in demand; vendor traffic (e.g., for a merchant, a merchant category, a website, a related merchant, etc.); and/or news related to the first product that provides an indication that demand for the first product is likely to experience an overall increase or decrease in demand. In certain embodiments, external data may be utilized to determine how to group or sub-group merchants, online stores 138, and/or off-platform websites 104, for example to determine similarity and/or distinction of stability responses for the merchants, online stores 138, and/or off-platform websites 104. In certain embodiments, the external data may be utilized to determine whether a volume is likely to be a stable volume demand (e.g., adjusting or correcting the historical sales data based on the external data, and/or predicting future sales data based on the historical sales data and the external data). In certain embodiments, the external data may be utilized to confirm that an otherwise stable volume demand is likely to continue to be a stable volume, to determine whether a marginal stable volume demand (e.g., near a boundary defining a stable volume demand, including above the boundary, below the boundary, or both) should be included as a stable volume demand. In certain embodiments, the external data may be utilized as a rationality check for the stable volume demand, for example confirming an otherwise stable volume demand as a stable volume demand if the external data indicates a neutral or positive trend, and applying additional criteria to the otherwise stable volume demand before confirmation if the external data indicates a negative trend.

Supplier Interactions to Receive First Product Information

Figure 11:
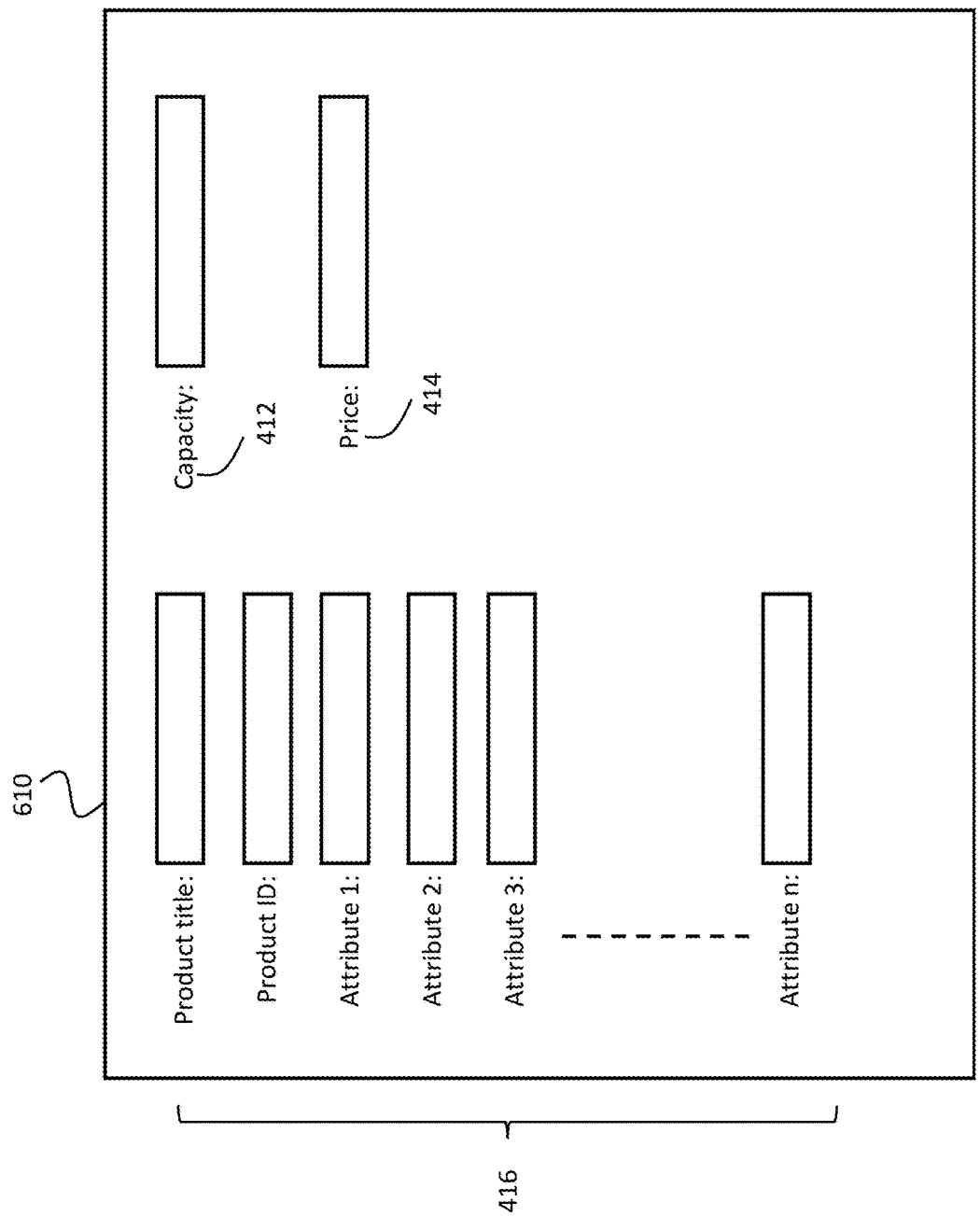
FIG. 11 is a schematic depiction of an embodiment of a supplier device user interface according to certain embodiments of the present disclosure.

Referencing FIG. 11, an example supplier interface 610 is depicted, having illustrative data entry fields that may be utilized by a supplier providing a first product 410. In certain embodiments, the e-commerce platform 100 may provide a first product 410 independently from the supplier interface 610, for example by evaluating sales of the supplier to merchants. The example supplier interface 610 includes a number of attribute 416 fields that can be populated for the first product 410. The example supplier interface 610 includes a capacity 412 field that can be populated for a capacity description of the first product 410—for example the number of the first product 410 that the supplier is capable to produce in a given period of time, and/or the number of the first product 410 that the supplier wishes to have considered for operations of the supply association engine 302 to determine a group of associated merchants that will provide a stable demand for the first product 410. The supplier interface 610 includes a price 414 field, which may be a description of the supplier sale price for the first product 410, a supplier cost to produce the first product 410, or the like. The supplier interface 610 is a simplified representative example, and can include operations such as automated scraping or querying of related data, interface elements to add fields, change units, change selected time frames, and the like.

Figure 12:
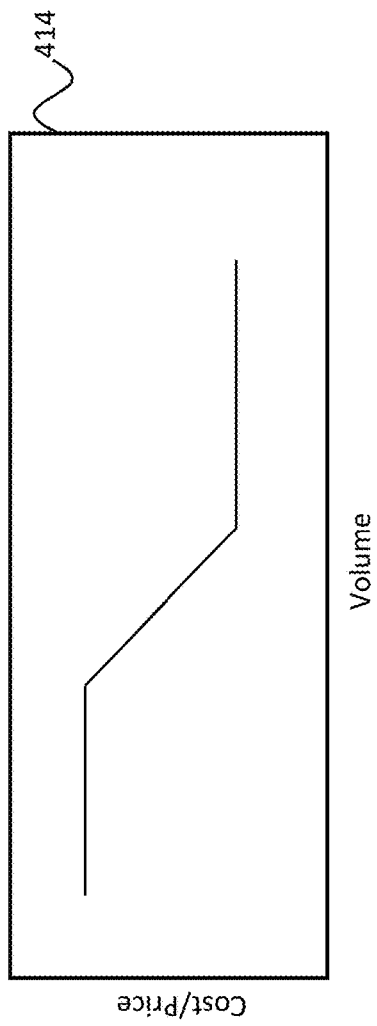
FIG. 12 is a schematic depiction of an illustrative cost description according to certain embodiments of the present disclosure.

Referencing FIG. 12, an example price 414 description for the first product 410 is depicted, which may be entered by the supplier through the supplier interface 610. In the example of FIG. 12, a discrete price function is depicted, for example where the price 414 is flat below a threshold volume, ramps down between the threshold volume and a second threshold volume, and is flat again (at a lower value than the first flat value, in the example) above the second threshold vale. The example price 414 of FIG. 12 is non-limiting, and a function may be of any shape and entry format (e.g., a graph, a data upload from the supplier, a look-up table, and/or an analytical function). It will be understood that the price 414 may be any shape, according to the capacity of the supplier, the cost of materials, manufacturing impact to higher or lower manufacturing rates (e.g., opening additional production lines, displacing other production, etc.). For the purpose of the present disclosure, the supplier criteria to determine the price 414 function are not limiting, but it will be understood that the supply association engine 302 is capable of utilizing any type of price 414 relationship with volume of the first product 410. An example embodiment includes a flat price 414 for the first product 410, a step-changed price 414 function (e.g., flat price tiers, with abrupt changes at certain volume thresholds). A price 414 description as utilized herein should be understood broadly, and includes, with respect to the first product, at least a supplier pricing structure, a supplier pricing, a supplier cost structure, and/or a supplier cost.

Figure 13:
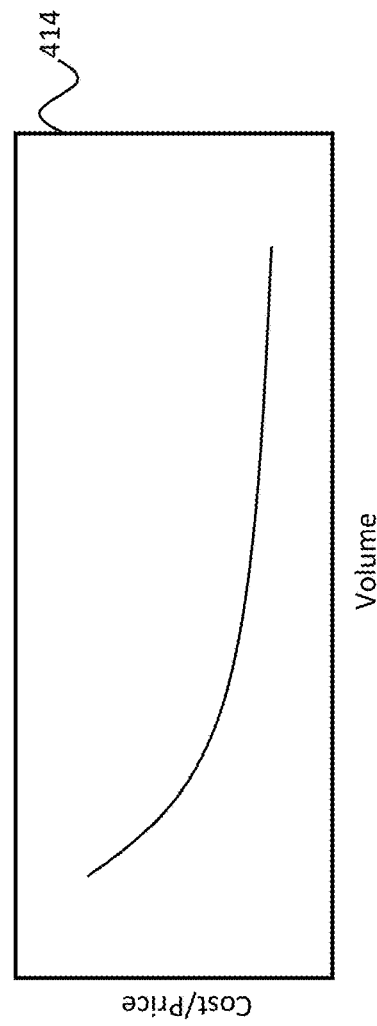
FIG. 13 is a schematic depiction of an illustrative cost description according to certain embodiments of the present disclosure.

Referencing FIG. 13, another example price 414 description for the first product 410 is depicted, which may be entered by the supplier through the supplier interface 610. The example of FIG. 13 depicts a continuous curved price 414 function, which may be an exponential decline, asymptotic approach to a lower limit pricing value, a diminishing returns curve for volume cost savings, or the like. As with the example of FIG. 12, the supplier criteria to determine the price 414 function is not limiting, but it will be understood that the supply association engine 302 is capable of utilizing any type of price 414 relationship with volume of the first product 410.

Figure 14:
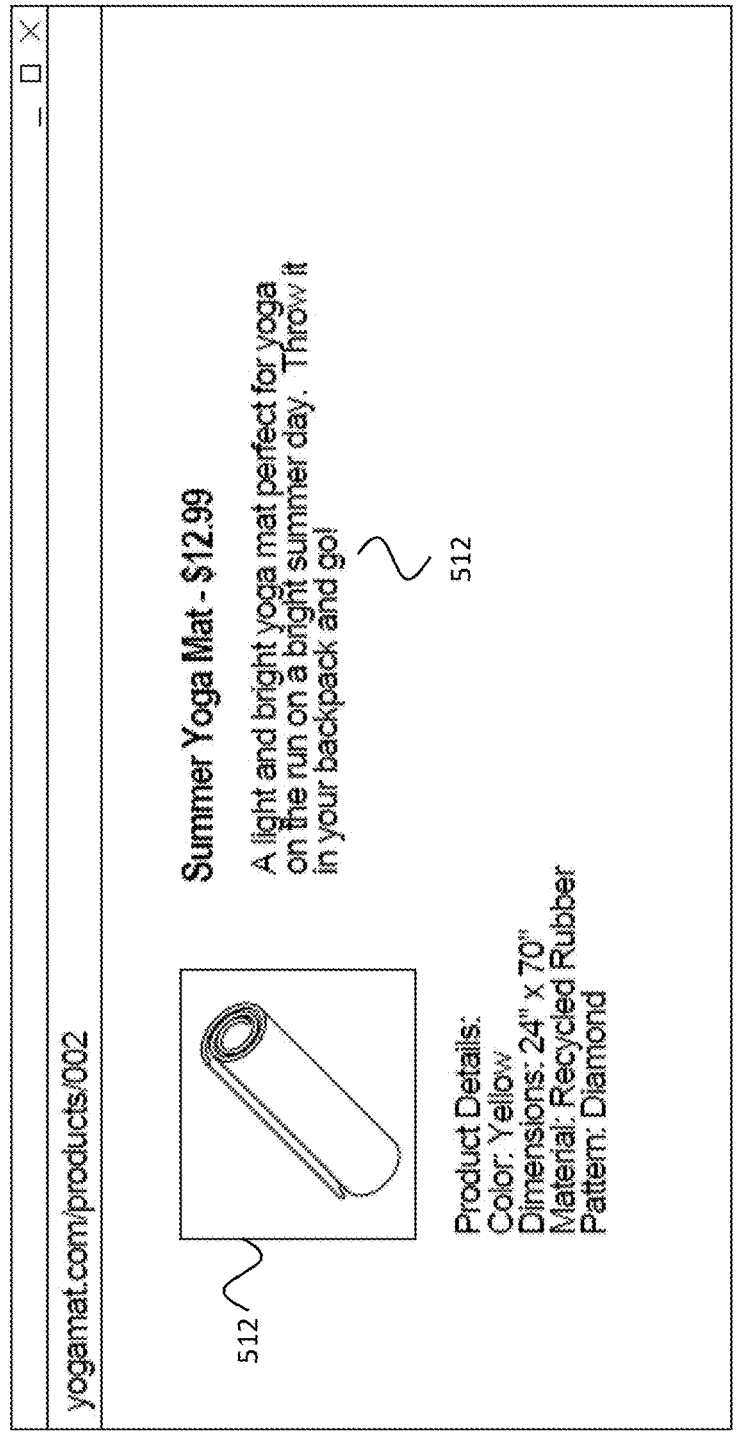
FIG. 14 is a schematic depiction of a merchant product webpage according to certain embodiments of the present disclosure.

Referencing FIG. 14, an example product web page 1400 for a product, for example utilized in an online store 138, an off-platform website 104, displayed at a kiosk or POS device, or the like, is depicted. The example of FIG. 14 includes a product description and product picture (both 512 in the example of FIG. 14). In certain embodiments, the product description 512 and product picture 512 are provided to a merchant associated with an online store 138 and/or off-platform website 104 selling a matched product 508 (e.g., as determined by the product data engine 502) with a stable demand (e.g., as determined by the stable volume engine 503) by the supply association engine 302. In certain embodiments, the supply association engine 302 provides the product description and/or product picture by transmitting the product description and/or product picture to a merchant device 102 corresponding to the associated merchant in response to determining the merchant is associated with a store having a matching product 508 with a stable demand. In certain embodiments, the supply association engine 302 provides the product description and/or product picture by storing the product description and/or product picture in a memory accessible to the merchant device 102, and/or with the corresponding merchant account on the e-commerce platform 100. The provision of the product description and/or product picture for the first product 410 provide for ease of updating a product web page 1400 selling the first product 410, and/or for automating operations to replace the matching product 508 with the first product 410 (e.g., where a matching product 508 is not identical, and/or has a different description and/or picture relative to the first product 410).

Operational Descriptions for Aspects of the Present Disclosure

A number of schematic flow diagrams of procedures according to embodiments of the present disclosure are set forth following. Operations depicted can be re-arranged in whole or part, divided, combined in whole or part, and in certain embodiments operations depicted can be omitted in whole or part, without limitation in accordance with embodiments otherwise set forth in the present disclosure. Operations depicted may be performed by any aspect of the e-commerce platform 100, including without limitation operations performed by the supply association engine 302, merchant device(s) 102, and/or supplier device(s) 104.

Figure 15:
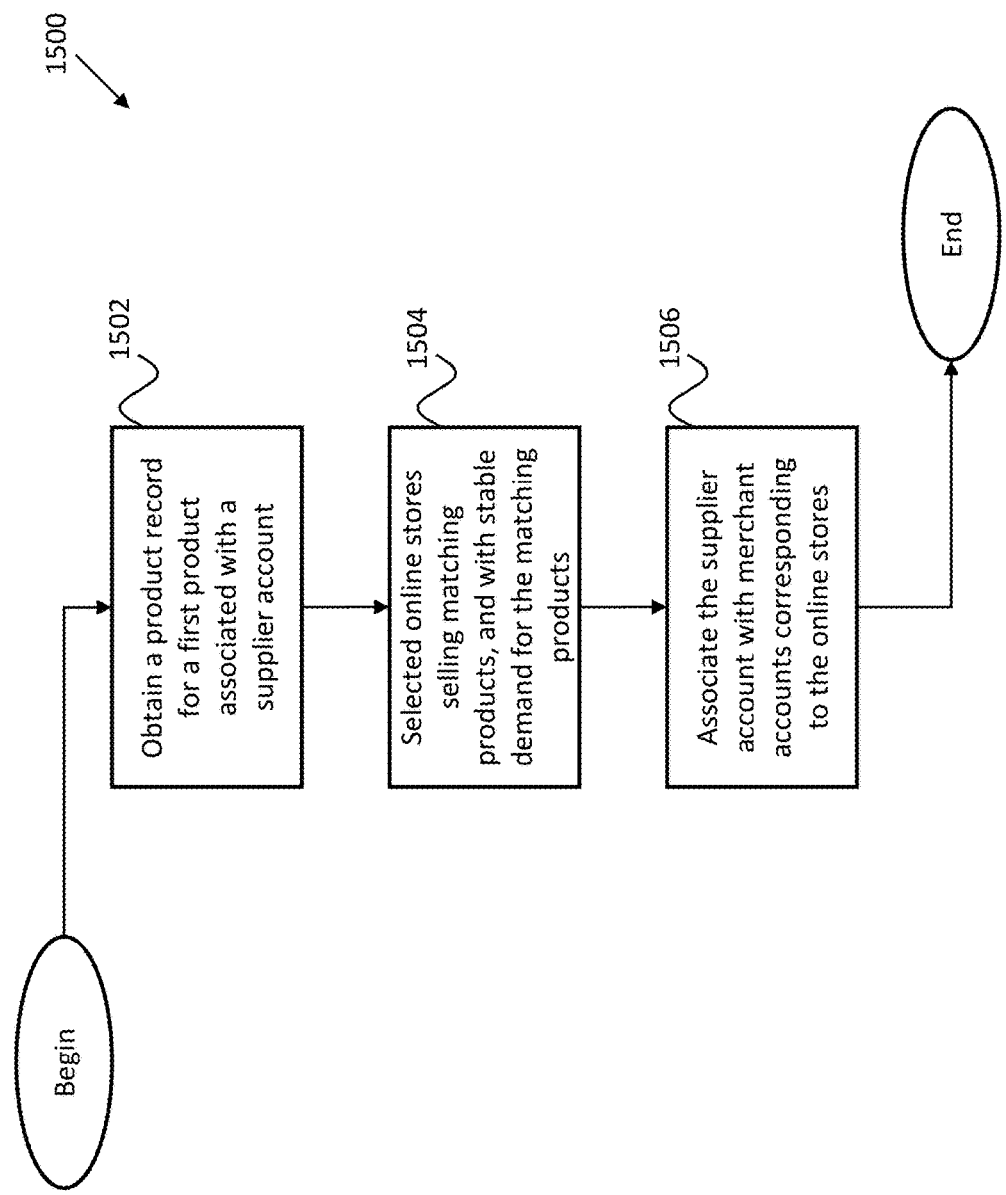
FIG. 15 is a schematic flow diagram of an example procedure to associate a supplier account with merchant account(s).

Referencing FIG. 15, an example procedure 1500 includes an operation 1502 to obtain a product record for a first product associated with a supplier account of a supplier of the first product, an operation 1504 to select, based on the product record and from amongst a number of online stores, online stores selling products matching the first products and with stable demand for those matching products, and an operation 1506 to associate the supplier account with merchant accounts corresponding to the selected online stores to allow the supplier to supply the selected online stores with the first product.

Figure 16:
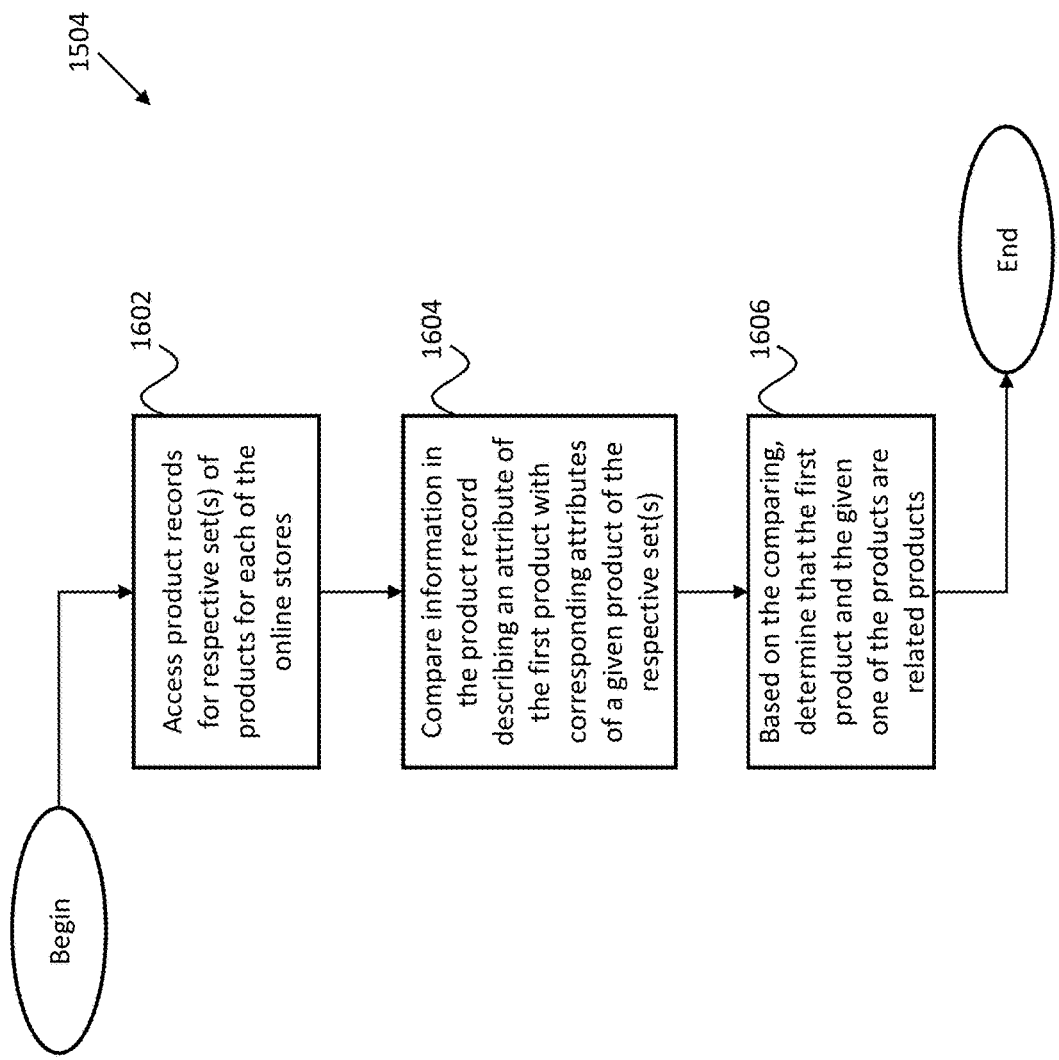
FIG. 16 is a schematic flow diagram of an example procedure to select related products to a first product.

Referencing FIG. 16, an example procedure 1504 is depicted, that may be performed as an alternative to, addition to, and/or enhancement to operation 1504 of procedure 1500. The example procedure 1504 includes, where each of the online stores of the number of online stores has a respective set of products for sale, and where information describing the attributes of products of the respective sets of products is stored in product records, where each record is stored in association with a product identifier, and an operation to determine that a given one of the products of the respective sets of products matches the first product by performing operations including: an operation 1602 to access product record for the respective set of products for sale, an operation 1604 to compare information about the product record describing an attribute of the first product to information in product records for a given one of the products of the respective sets of products, and an operation 1606 to determine that the first product and the given one of the products are related products based on the comparing.

Figure 17:
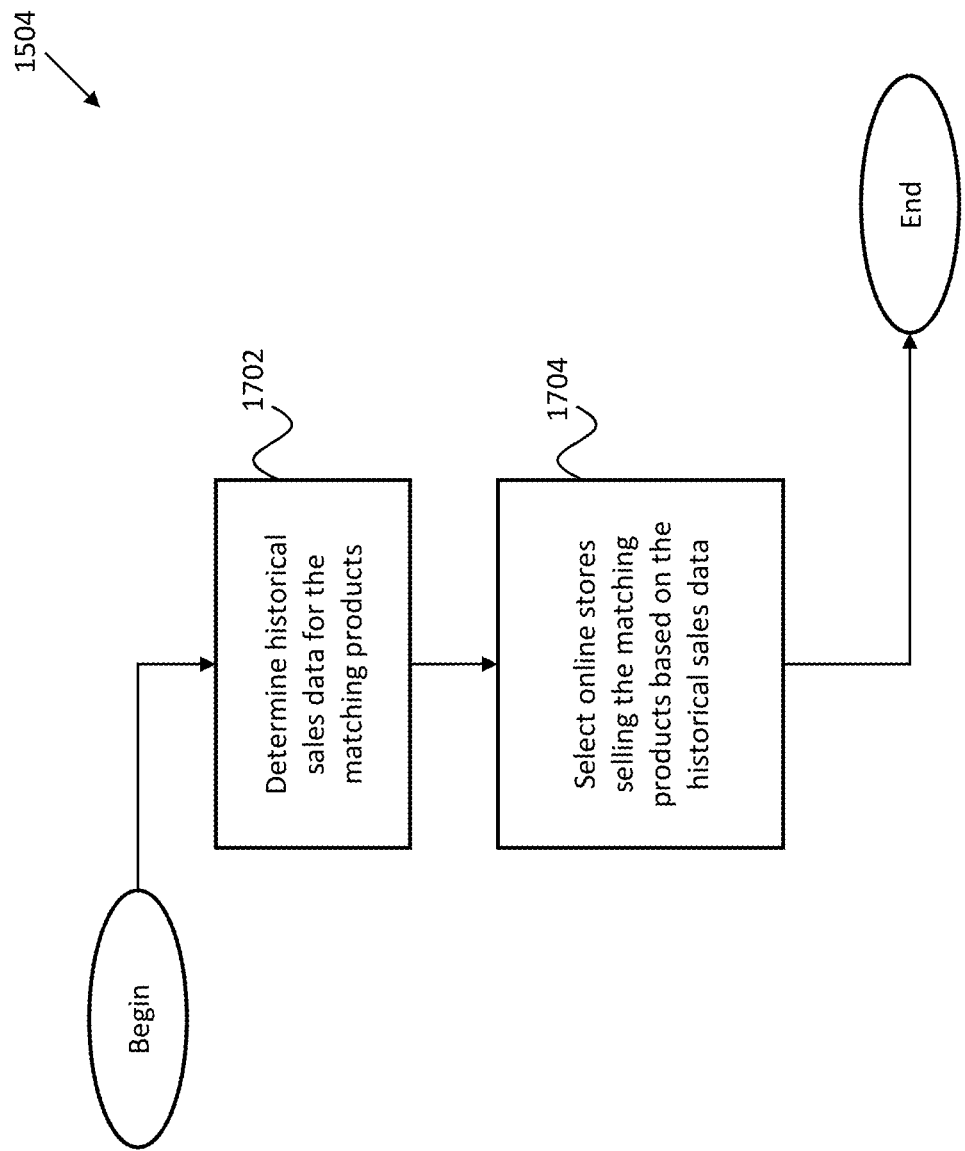
FIG. 17 is a schematic flow diagram of an example procedure to select online stores based on historical sales data for matching products.

Referencing FIG. 17, an example procedure 1504 is depicted, that may be performed as an alternative to, addition to, and/or enhancement to operation 1504 of procedure 1500. The example procedure 1504 includes an operation 1702 to determine historical sales data for the matching products, and an operation 1704 to select online stores selling the matching products based on the historical sales data.

Figure 18:
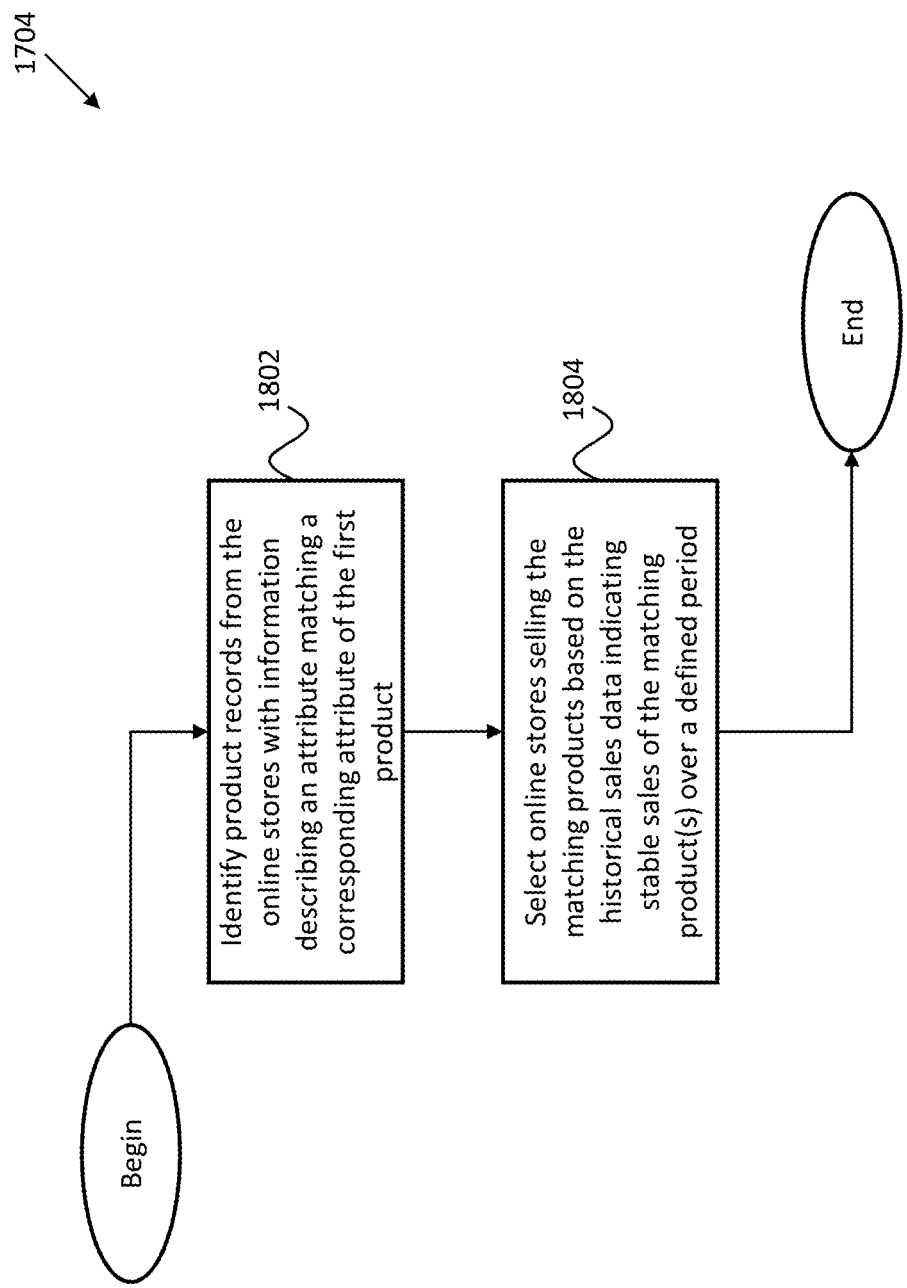
FIG. 18 is a schematic flow diagram of an example procedure to select online stores based on historical sales data for matching products.

Referencing FIG. 18, an example procedure 1704 is depicted, that may be performed as an alternative to, addition to, and/or enhancement to operation 1704 of procedure 1504 as depicted in FIG. 17. The example procedure 1704 includes an operation 1802 to identify product records from the online stores with information describing an attribute matching a corresponding attribute of the first product, and an operation 1804 to select online stores selling the matching products based on the historical sales data indicating stable sales of the matching product(s) over a defined period.

Figure 19:
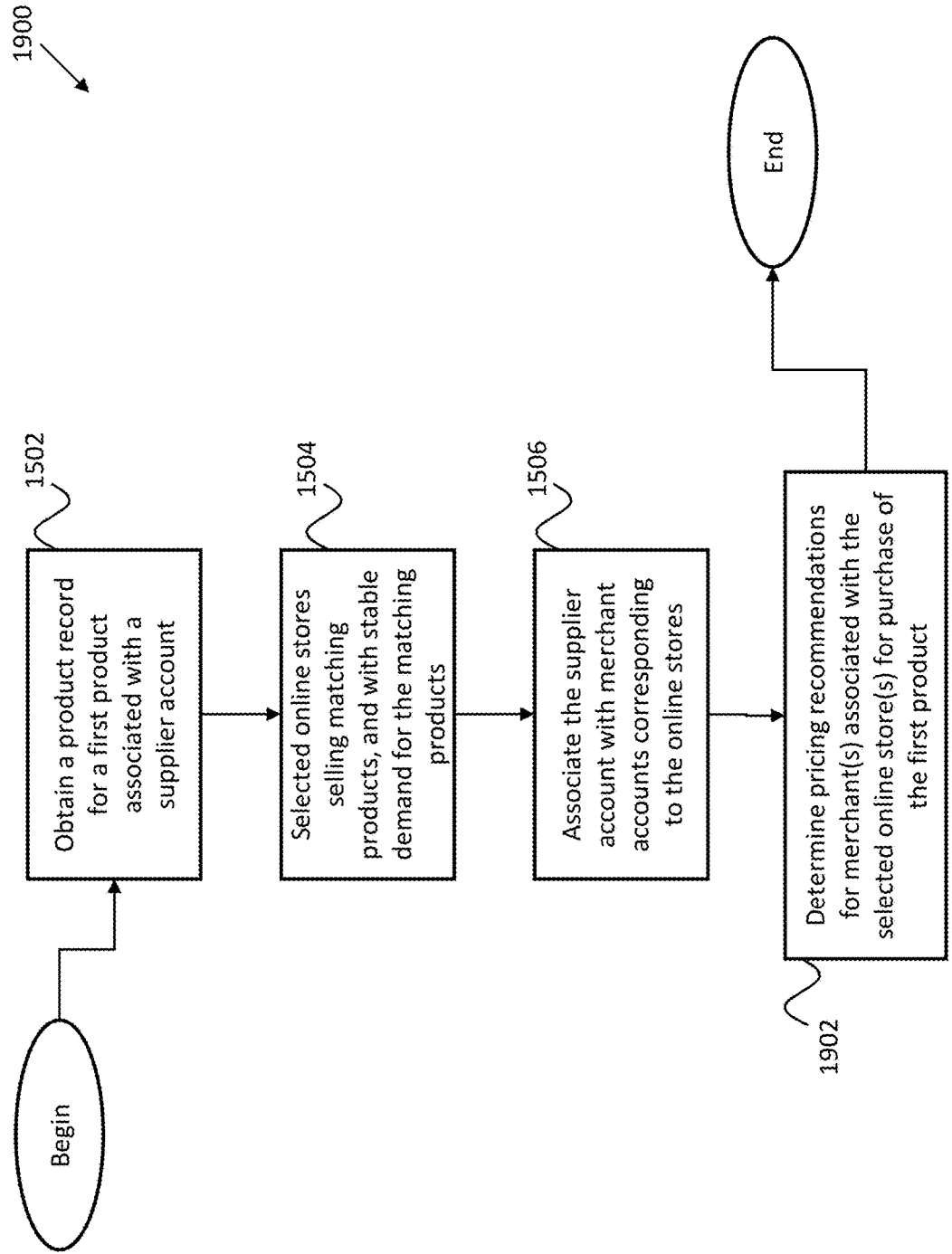
FIG. 19 is a schematic flow diagram of an example procedure to associate a supplier account with merchant account(s), and to provide pricing recommendations for merchant(s) to purchase the first product.

Referencing FIG. 19, an example procedure 1900 is depicted. The procedure 1900 is similar to the procedure 1500, and further includes an operation 1902 to determine pricing recommendations for merchants associated with the selected online stores for purchase of the first product.

Figure 20:
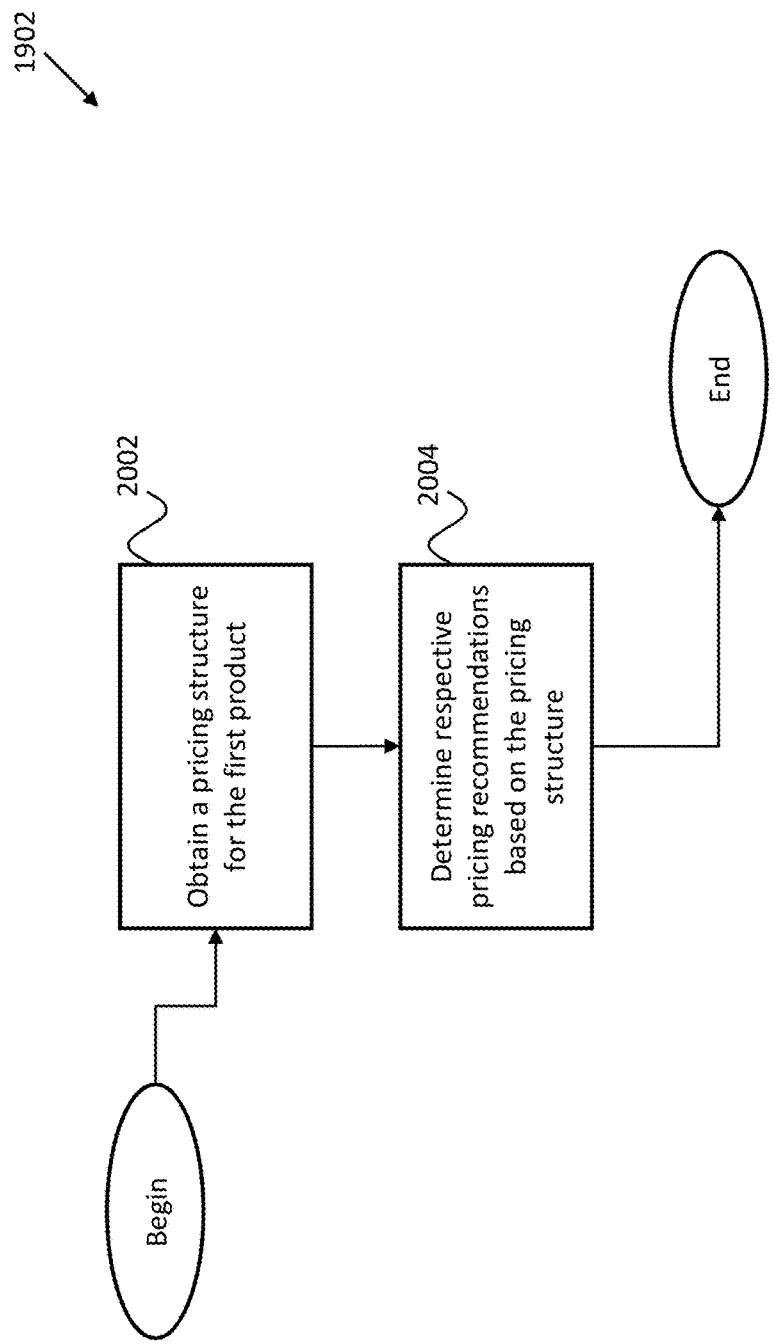
FIG. 20 is a schematic flow diagram of an example procedure to determine pricing recommendations for merchant(s) to purchase the first product.

Referencing FIG. 20, an example procedure 1902 is depicted, that may be performed as an alternative to, addition to, and/or enhancement to operation 1902 of procedure 1900. The example procedure 1902 includes an operation 2002 to obtain a pricing structure for the first product, and an operation 2004 to determine respective pricing recommendations based on the pricing structure.

Figure 21:
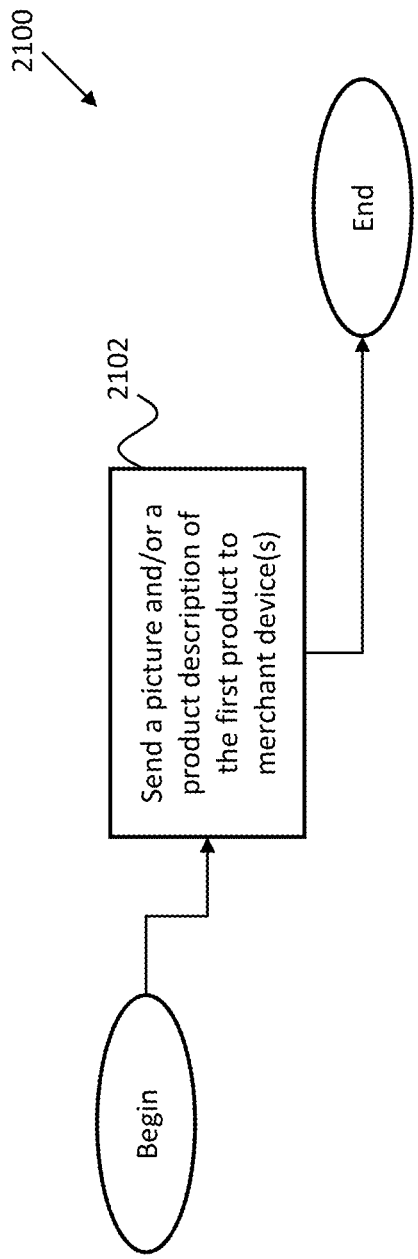
FIG. 21 is a schematic flow diagram of an example procedure to provide first product information to merchant(s).

Referencing FIG. 21, an example procedure 2100 is depicted, that may be performed in addition to, and/or as an enhancement to operation 1506 of procedure 1500. The procedure 2100 includes an operation 2102 to send a picture and/or a product description of the first product to a merchant device for a merchant associated with an online store and/or off-platform website selling a matching product to the first product, in response to determining the online store and/or off-platform website has a stable demand for the matching product.

Figure 22:
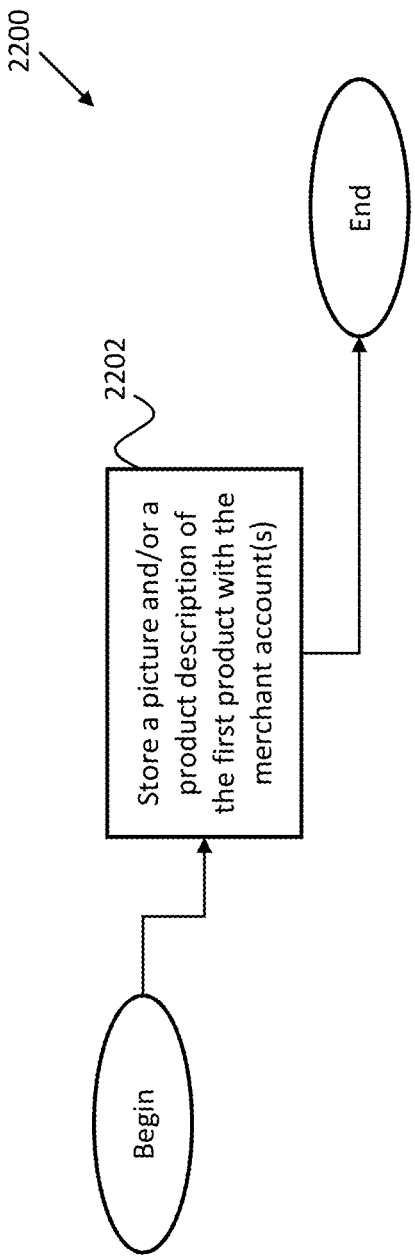
FIG. 22 is a schematic flow diagram of an example procedure to store first product information with merchant account(s).

Referencing FIG. 22, an example procedure 2200 is depicted, that may be performed in addition to, and/or as an enhancement to operation 1506 of procedure 1500. The procedure 2200 includes an operation 2202 to store a picture and/or a product description of the first product with a merchant account corresponding to a merchant associated with an online store and/or off-platform website selling a matching product to the first product, in response to determining the online store and/or off-platform website has a stable demand for the matching product.

Further in reference to FIGS. 21 and 22, procedures may include operations to promote the first product in search results, e.g., with respect to merchants, retailers, buyers, customers, or other users using the platform or otherwise available in relation to the platform, online stores 138, external search engines, or the like. In certain embodiments, operations to promote the first product include utilization of a picture and/or a product description of the first product. Example procedures may include operations to surface the first product through a recommendation, for example in user interactions with the platform or otherwise away from the platform, such as interactions with online stores 138, search engines, or the like. Operations to surface the first product may be performed utilizing a picture and/or a product description of the first product. In certain embodiments, operations to promote search results of the first product, and/or to surface the first product such as in a recommendation, are performed in response to user interactions relating to attributes of the first product, as described throughout the present disclosure, and including at least keywords, SKUs, terms from a product description, and/or terms related to a context for the first product (e.g. usage, problems solved, etc.).

Figure 23:
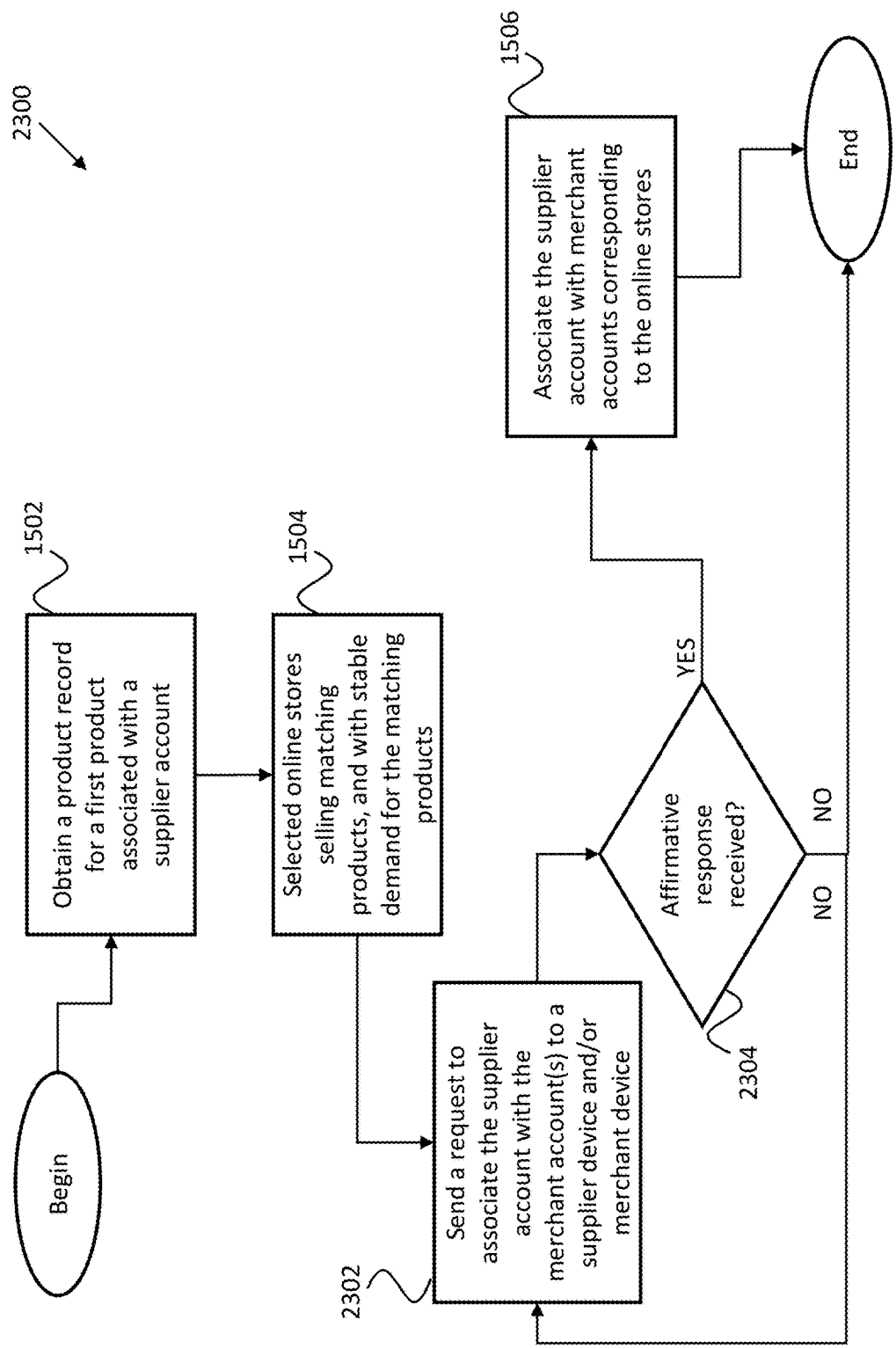
FIG. 23 is a schematic flow diagram of an example procedure to associate a supplier account with merchant account(s) responsive to supplier confirmation.

Referencing FIG. 23, an example procedure 2300 is depicted. The procedure 2300 is similar to the procedure 1500, and further includes an operation 2302 to send a request to associate the supplier account with a merchant account corresponding to a merchant associated with an online store and/or off-platform website selling a matching product to the first product, in response to determining the online store and/or off-platform website sells the matching product. The operation 2302 includes sending the request to a supplier device (e.g., requesting supplier approval) and/or sending the request to a merchant device (e.g., requesting the associated merchant approval). The example procedure 2300 includes, in response to receiving an indication confirming the association (e.g., operation 2304, with a YES determination), proceeding with operation 1506 to associate the supplier account with the merchant account. The procedure 2300 includes, where the operation 2304 has a NO determination (confirmation of the association request is not received), to selectively return to operation 2302 (re-send the request, and/or wait at operation 2304 for a selected period such as a time period, a next log-in event for the respective merchant device and/or supplier device, etc.), or to conclude the procedure 2300 (e.g., where a wait period has expired, or a disapproval of the association is received at operation 2304). In certain embodiments, the procedure 2300 includes operating a respective user interface 602, 610 to allow for the merchant and/or supplier to provide a counter offer before making the association (e.g., a different first product price and/or order volume relative to the recommended price and/or volume utilized to determine the account associations 306 used to make the request of operation 2302).

Figure 24:
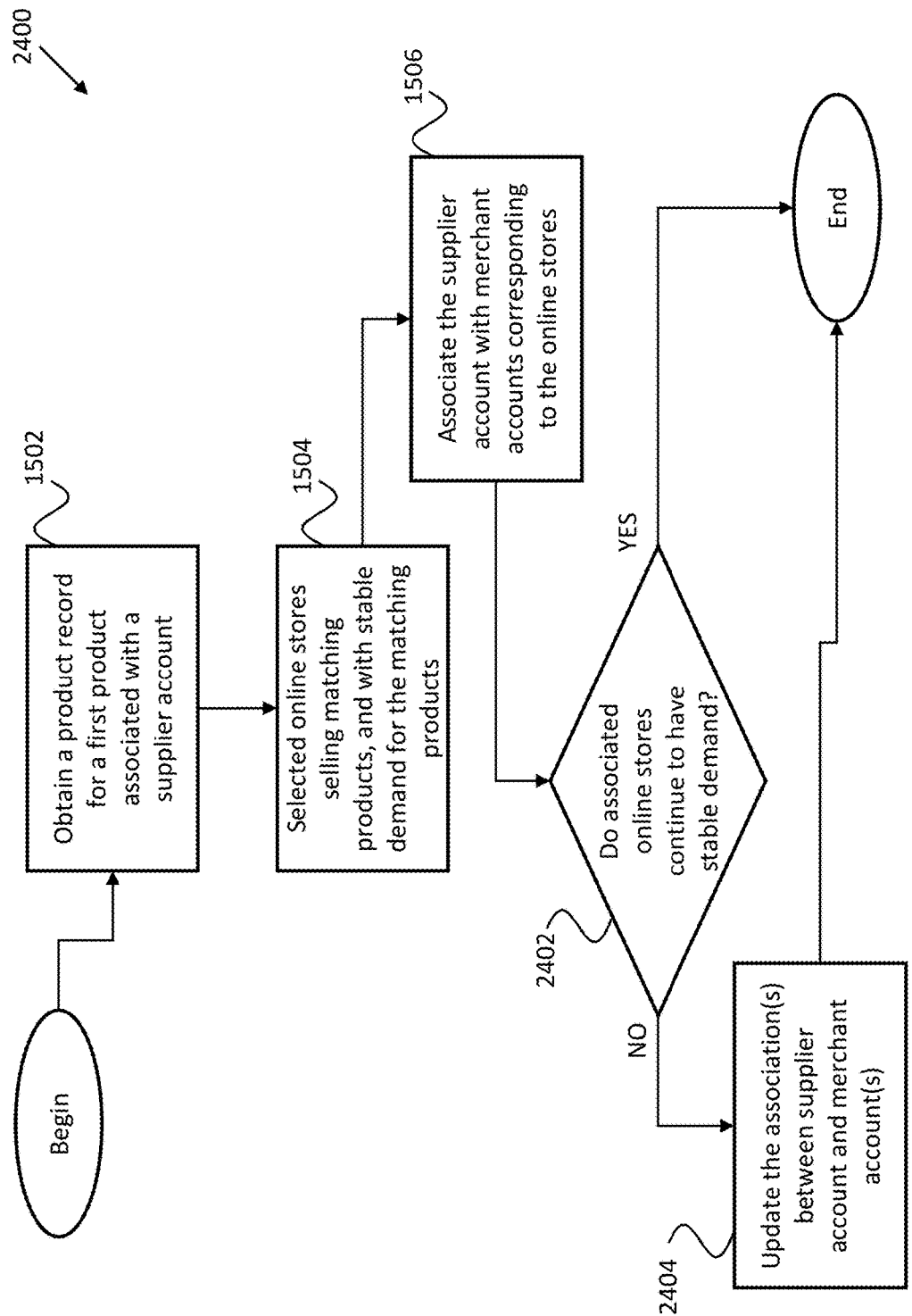
FIG. 24 is a schematic flow diagram of an example procedure to update an association of a supplier account with merchant account(s) based on monitored sales volumes of the first product.

Referencing FIG. 24, an example procedure 2400 is depicted. The procedure 2400 is similar to the procedure 1500, and further includes an operation 2402 to determine whether associated online stores (e.g., online stores and/or off-platform websites associated with merchants corresponding to the associated merchant account) continue to have stable demand for a matching product, and/or whether the group of associated online stores continue to have an aggregated stable demand for the matching products. For example, the product data engine and stable volume engine may operate periodically, upon request (e.g., from a supplier, administrator of the e-Commerce platform, and/or the merchant), and/or in response to an event (e.g., an attribute change of the first product, a reduction in the ordered volume for the first product such as due to inactive, discontinued, and/or retiring merchant activity related to the first product), to determine whether the merchant continues to have a matching product and/or a stable demand for the first product.

In certain embodiments, criteria to determine the stable demand may be distinct for an associated merchant or the merchant group than utilized to determine the original association (e.g., shorter or longer time periods, adjustments to volume thresholds, adjustments to volume change rates, etc.), for example to prevent dithering of merchants in and out of the account associations 306. The example procedure 2400 includes an operation 2404 to update the association(s) between the supplier account and the merchant account(s) in response to the operation 2402—for example removing merchants from the association, updating pricing recommendations 510, and/or updating product descriptions/pictures 512. In certain embodiments, the operation 2404 further includes selecting, based on the product record and from amongst a number of online stores, additional online stores selling products matching the first product, and combined with the selected online stores, having the aggregate stable demand for those matching products. In certain embodiments, the operation 2404 further includes associating the supplier account with merchant accounts corresponding to the selected additional online stores to allow the supplier to supply the selected additional online stores with the first product.

Figure 25:
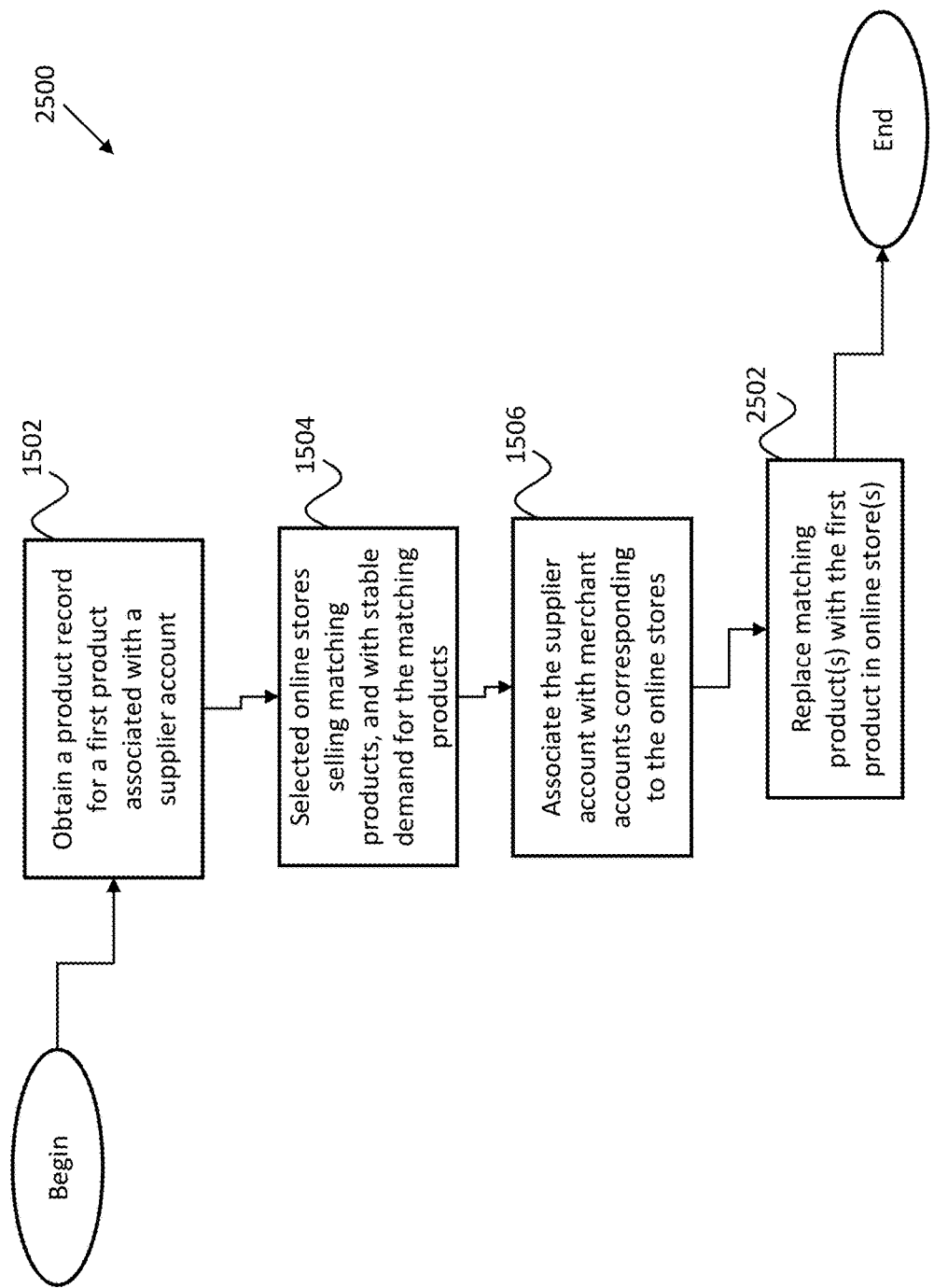
FIG. 25 is a schematic flow diagram of an example procedure to replace a matching product with the first product for selected online store(s).

Referencing FIG. 25, an example procedure 2500 is depicted. The procedure 2500 is similar to the procedure 1500, and further includes an operation 2502 to replace matching products with the first product in an online store and/or off-platform website (e.g., where the e-Commerce platform 100 includes an API or other interface to adjust the off-platform website). For example, where the first product includes a change to an attribute, picture, vendor, or other customer visible attribute relative to the matching product, the supply association engine 302 may include operations to create an additional page to sell the first product (e.g., until inventory of the matching product is depleted) and/or may include operations to replace the matching product with the first product (e.g., where the merchant does not maintain an inventory, wants to immediately switch to the first product, or the like) as soon as the first product is available. Note that product attribute differences that may be visible to the customer may not be relevant, or may be sufficiently insignificant (e.g., a display change, different picture, description, etc.), such that a given previous product is a matching product, but is nevertheless replaced with the first product.

Figure 26:
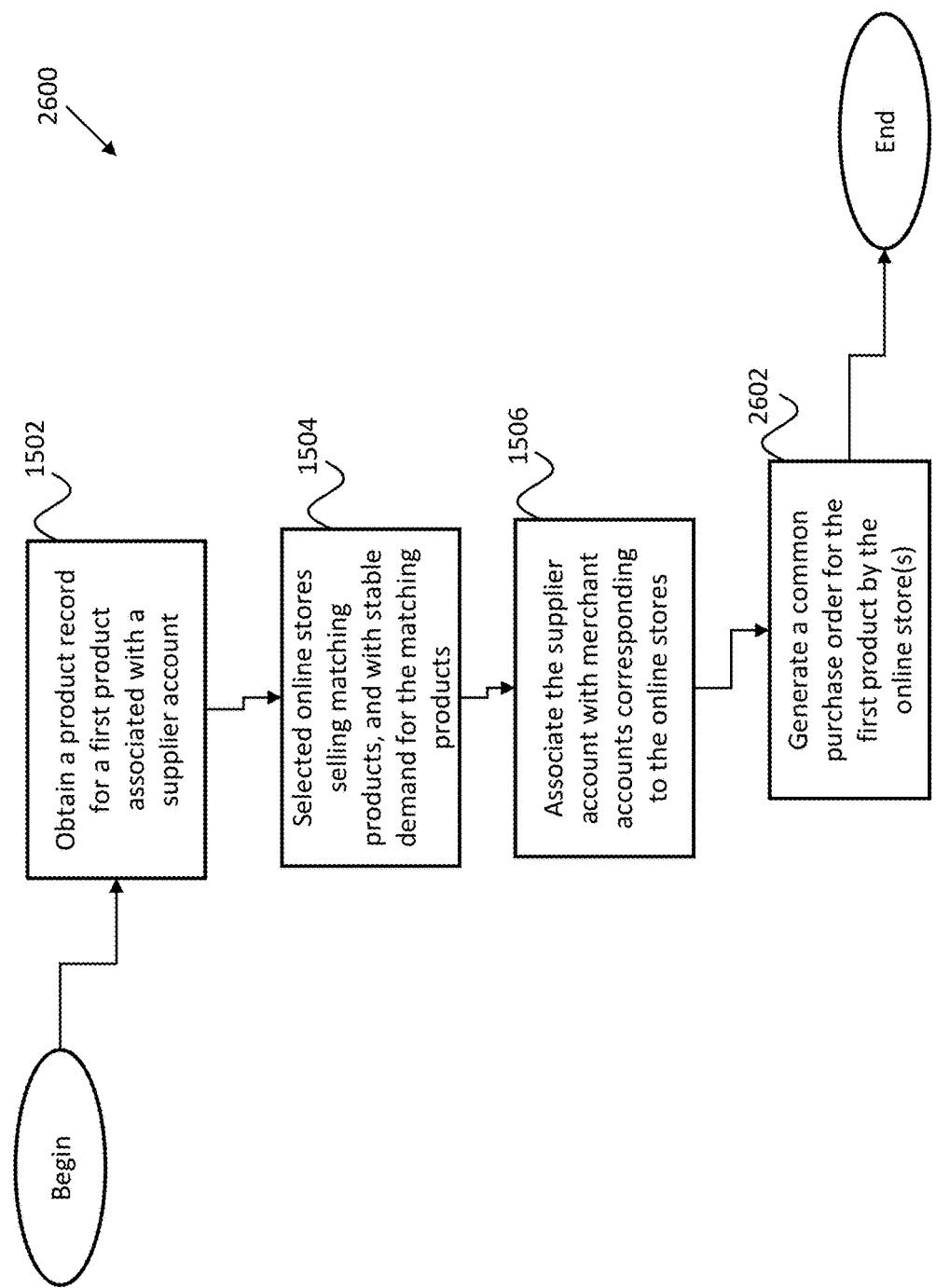
FIG. 26 is a schematic flow diagram of an example procedure to generate a common purchase order for the first product from the supplier for selected online store(s).

Referencing FIG. 26, an example procedure 2600 is depicted. The procedure 2600 is similar to the procedure 1500, and further includes an operation 2602 to generate a common purchase order for the first product by the online store(s). The operation 2602 may be performed to order the first product for a number of online stores corresponding to associated merchants as determined at operation 1506. The operation 2602 may include a purchase order for online stores representing all of the associated merchants, or a subset of the associated merchants. In certain embodiments, preferences entered by merchants through the user interface 602 may determine whether online stores corresponding to respective merchants are included in the common purchase order. In certain embodiments, preference entered by the supplier through the user interface 610 may determine whether a common purchase order is utilized, and/or whether all merchants or a subset of merchants are included in the common purchase order. The common purchase order may include shipping information for online stores (and/or other shipping locations, e.g., for merchants having drop shipped orders), quantities of the first product, and/or pricing for the merchants (which may be common or distinct, according to the price recommendations 510 or other aspects of the present disclosure).

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include $4^{th}$ Generation (4G) networks (e.g. Long Term Evolution (LTE)) or $5^{th}$ Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
maintaining, at an e-commerce platform, a plurality of merchant accounts, and a plurality of supplier accounts. where each merchant account of the plurality of merchant accounts is associated to a respective plurality of merchant products and where at least one supplier account of the plurality of supplier accounts is associated to a first product;
providing an online store for each merchant account, the providing comprising tallying historical sales data for each of the plurality of merchant products;
obtaining a product record for the first product;
identifying product records of the plurality of merchant accounts with information describing an attribute matching a corresponding attribute of the first product to determine merchant accounts selling products matching the first product;
selecting, based on historical sales data and from amongst the plurality of merchant accounts, merchant accounts that sell products matching the first product and have, based on the historical sales data, aggregate stable sales of those matching products over a defined period, wherein aggregate stable sales correspond to at least one of a sales volume over a threshold within the defined period and a sales volume varying by less than a defined amount within the defined period; and
associating the supplier account with the selected merchant accounts to allow a supplier of the supplier account to supply the online stores of the selected merchant accounts with the first product.

2. The method of claim 1,
wherein information describing attributes of merchant products of the respective plurality of merchant products is stored in product records, each record stored in association with a product identifier, and
wherein determining that a given one of the products of the respective plurality of merchant products matches the first product includes:
comparing information in the product record describing the attribute of the first product to information in product records of the plurality of merchant accounts describing the corresponding attribute of the given one of the products; and
based on the comparing, determining that the first product and the given one of the products are related products.

3. The method of claim 1 wherein the product record for the first product includes information describing one or more attributes of the first product.

4. The method of claim 1, further comprising:
determining respective price recommendations for the selected merchants accounts for purchases of the first product.

5. The method of claim 4, further comprising:
obtaining a pricing structure for supply of the first product by the at least one supplier account, wherein the respective prices are determined based on the pricing structure.

6. The method of claim 1, wherein associating the at least one supplier account with the selected merchant accounts includes sending at least one of a picture of the first product and a description of the first product to one or more merchant devices associated with the merchant accounts.

7. The method of claim 1, wherein associating the supplier account with the selected merchant accounts includes storing at least one of a picture of the first product and a description of the first product in association with one or more of the merchant accounts.

8. The method of claim 1, further comprising:
sending, to a merchant device associated with a merchant account from the selected merchant accounts, a request to associate the supplier account with the merchant account; and
receiving, from the merchant device, an indication confirming that the supplier account should be associated with the merchant account,
wherein the supplier account is associated with the merchant account responsive to receiving the indication from the merchant device.

9. The method of claim 1, further comprising:
sending, to a supplier device associated with the supplier account, a request to associate the supplier account with the selected merchant accounts; and
receiving, from the supplier device, an indication confirming that the supplier account should be associated with the selected merchant accounts,
wherein the supplier account is associated with the selected merchant accounts responsive to the receiving the indication confirmation.

10. The method of claim 1, further comprising:
generating a common purchase order for the first product from the supplier, the common purchase order corresponding to purchases of the first product by the selected merchant accounts.

11. The method of claim 1, further comprising:
detecting that one of the selected merchant accounts no longer has stable sales for at least one of the matching products and the first product; and
responsive to detecting that one of the selected merchant accounts no longer has stable sales for at least one of the matching products and the first product, disassociating the supplier account with the one of the selected merchant accounts.

12. The method of claim 1, further comprising:
detecting that the selected merchant accounts selling products matching the first product no longer have aggregate stable sales for those matching products;
selecting, based on the product record and from amongst the plurality of merchant accounts, additional merchant accounts selling products matching the first product and, combined with the selected merchant accounts, having the aggregate stable sales for those matching products; and
associating the supplier account with the additional merchant accounts to allow the supplier to supply the selected additional online stores with the first product.

13. The method of claim 1, further comprising:
replacing one or more of the products matching the first product with the first product in one or more of online stores associated with the selected merchant accounts.

14. A system, comprising:
a memory to store a plurality of merchant accounts, and a plurality of supplier accounts. where each merchant account of the plurality of merchant accounts is associated to a respective plurality of merchant products and where at least one supplier account of the plurality of supplier accounts is associated to a first product;

at least one processor to:
provide an online store for each merchant account, the providing comprising tallying historical sales data for each of the plurality of merchant products;
obtain the product record for the first product;
identify product records of the plurality of merchant accounts with information describing an attribute matching a corresponding attribute of the first product to determine merchant accounts selling products matching the first product;
select, based on historical sales data and from amongst the plurality of merchant accounts, merchant accounts that sell products matching the first product and have, based on the historical sales data, aggregate stable sales of those matching products over a defined period, wherein aggregate stable sales correspond to at least one of a sales volume over a threshold within the defined period and a sales volume varying by less than a defined amount within the defined period; and
store in the memory an association between the supplier account and the selected merchant accounts to allow a supplier of the supplier account to supply the online stores of the selected merchant accounts with the first product.

15. The system of claim 14,
wherein information describing attributes of merchant products of the respective plurality of merchant products is stored in product records in the memory, each record stored in association with a product identifier, and
wherein the processor is further to determine that a given one of the products of the respective plurality of merchant products matches the first product by performing the operations of:
compare information in the product record describing the attribute of the first product to information in product records of the plurality of merchant accounts describing the corresponding attribute of the given one of the products; and
based on the comparing, determine that the first product and the given one of the products are related products.

16. The system of claim 14, wherein the processor is further to:
send, to a merchant device associated with a merchant account from the selected merchant accounts, a request to associate the supplier account with the merchant account;
receive, from the merchant device, an indication confirming that the supplier account should be associated with the merchant account; and
wherein the supplier account is associated with the merchant account responsive to receiving the indication from the merchant device.

17. The system of claim 14, wherein the processor is further to:
send, to a supplier device associated with the supplier account, a request to associate the supplier account with the selected merchant accounts;
receive, from the supplier device, an indication confirming that the supplier account should be associated with the selected merchant accounts; and
wherein the supplier account is associated with the selected merchant accounts responsive to the receiving the indication confirmation.

18. The system of claim 14, further comprising:
wherein the product record for the first product includes information describing one or more attributes of the first product; and
wherein the processor is further to:
determine the matching products by comparing a particular attribute of the first product to a corresponding attribute of a candidate product sold by one of the plurality of merchant accounts, and
determine the candidate product is one of the matching products based on the comparing.

19. A non-transitory computer-readable storage medium storing instructions, that when executed by a processor of a computer system cause the computer system to:
maintain, at an e-commerce platform, a plurality of merchant accounts, and a plurality of supplier accounts. where each merchant account of the plurality of merchant accounts is associated to a respective plurality of merchant products and where at least one supplier account of the plurality of supplier accounts is associated to a first product;
provide an online store for each merchant account, the providing comprising tallying historical sales data for each of the plurality of merchant products;
obtain a product record for the first product;
identify product records of the plurality of merchant accounts with information describing an attribute matching a corresponding attribute of the first product to determine merchant accounts selling products matching the first product;
select, based on historical sales data the and from amongst the plurality of merchant accounts, merchant accounts that sell products matching the first product and have, based on the historical sales data, aggregate stable sales of those matching products over a defined period, wherein aggregate stable sales correspond to at least one of a sales volume over a threshold within the defined period and a sales volume varying by less than a defined amount within the defined period; and
store an association between the supplier account and the selected merchant accounts to allow the supplier to supply the online stores of the selected merchant accounts with the first product.

20. The non-transitory computer-readable storage medium of claim 19,
wherein information describing attributes of merchant products of the respective plurality of merchant products is stored in product records, each record stored in association with a product identifier, and
wherein determining that a given one of the products of the respective plurality of merchant products matches the first product includes:
comparing information in the product record describing the attribute of the first product to information in product records of the plurality of merchant accounts describing the corresponding attribute of the given one of the products; and
based on the comparing, determining that the first product and the given one of the products are related products.

21. The non-transitory computer-readable storage medium of claim 19, wherein the instructions, when executed by the processor, further cause the computer system to:
send, to a merchant device associated with a merchant account from the selected merchant accounts, a request to associate the supplier account with the merchant account;

receive, from the merchant device, an indication confirming that the supplier account should be associated with the merchant account; and wherein the supplier account is associated with the merchant account responsive to receiving the indication from the merchant device.

22. The non-transitory computer-readable storage medium of claim 19, wherein the instructions, when executed by the processor, further cause the computer system to:

send, to a supplier device associated with the supplier account, a request to associate the supplier account with the selected merchant accounts;

receive, from the supplier device, an indication confirming that the supplier account should be associated with the selected merchant accounts; and wherein the supplier account is associated with the selected merchant accounts responsive to the receiving the indication confirmation.

23. The non-transitory computer-readable storage medium of claim 19, wherein the product record for the first product includes information describing one or more attributes of the first product; and wherein the instructions, when executed by the processor, further cause the computer system to:

determine the matching products by comparing a particular attribute of the first product to a corresponding attribute of a candidate product sold by one of the plurality of merchant accounts, and determine the candidate product is one of the matching products based on the comparing.

24. The non-transitory computer-readable storage medium of claim 19, wherein the instructions, when executed by the processor, further cause the computer system to:

determine respective price recommendations for the selected merchants accounts for purchases of the first product.

25. The non-transitory computer-readable storage medium of claim 24, wherein the instructions, when executed by the processor, further cause the computer system to:

obtain a pricing structure for supply of the first product by the at least one supplier account, wherein the respective prices are determined based on the pricing structure.

* * * * *